US012587770B1

(12) United States Patent
Yang et al.

(10) Patent No.: US 12,587,770 B1
(45) Date of Patent: Mar. 24, 2026

(54) SUSPENSION SYSTEM FOR HIGH-ASPECT RATIO AUDIO TRANSDUCER

(71) Applicant: Amazon Technologies, Inc., Seattle, WA (US)

(72) Inventors: Wei Yang, Lexington, MA (US); Alexander Victor Salvatti, Morgan Hill, CA (US); Douglas K. Hogue, Bothell, WA (US); Richard Warren Little, Issaquah, WA (US); Lakshmikanth Tipparaju, Campbell, CA (US)

(73) Assignee: Amazon Technologies, Inc., Seattle, WA (US)

( * ) Notice: Subject to any disclaimer, the term of this patent is extended or adjusted under 35 U.S.C. 154(b) by 69 days.

(21) Appl. No.: 18/614,075

(22) Filed: Mar. 22, 2024

Related U.S. Application Data

(60) Provisional application No. 63/453,810, filed on Mar. 22, 2023.

(51) Int. Cl.
*H04R 1/02* (2006.01)
*H04R 9/04* (2006.01)

(52) U.S. Cl.
CPC ............ *H04R 1/025* (2013.01); *H04R 9/043* (2013.01); *H04R 2201/02* (2013.01)

(58) Field of Classification Search
CPC ..... H04R 2400/07; H04R 31/003; H04R 7/20
USPC ............................................... 381/423, 398
See application file for complete search history.

(56) References Cited

FOREIGN PATENT DOCUMENTS

| | | | |
|---|---|---|---|
| JP | 2013030872 A | * | 2/2013 |
| JP | 5410243 B2 | * | 2/2014 |

* cited by examiner

*Primary Examiner* — Sunita Joshi
(74) *Attorney, Agent, or Firm* — Eversheds Sutherland (US) LLP

(57) ABSTRACT

An audio transducer includes a frame and a suspension system at least partially disposed in the frame. The suspension system has a first axis, a second axis, a first section disposed along the first axis, a second section disposed along the first axis, a third section disposed along the second axis, and a fourth section disposed along the second axis. The first section has one or more first corrugations, the second section has one or more second corrugations, the third section has one or more third corrugations different than the one or more first corrugations, and the fourth section has one or more fourth corrugations different than the one or more first corrugations.

20 Claims, 21 Drawing Sheets

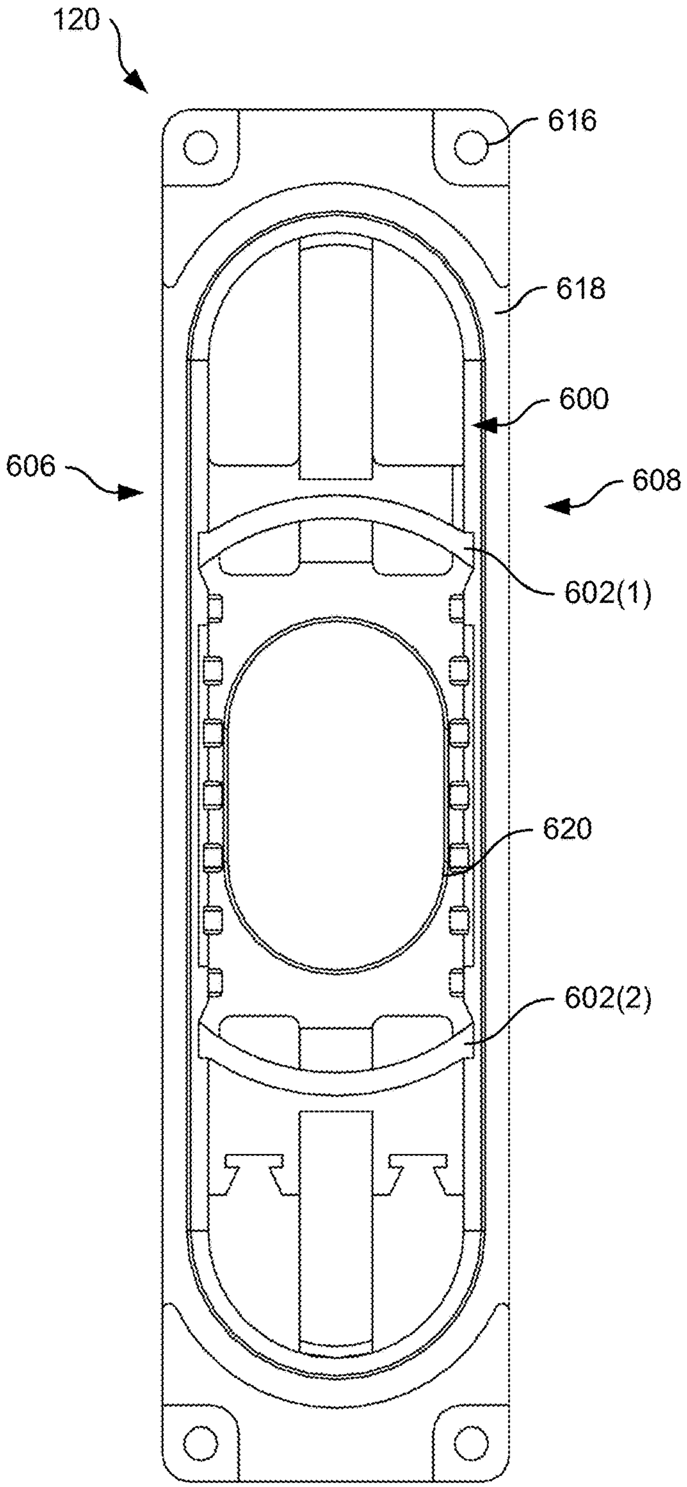
FIG. 6C
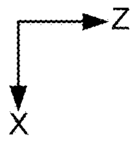

SUSPENSION SYSTEM FOR HIGH-ASPECT RATIO AUDIO TRANSDUCER

CROSS-REFERENCE TO RELATED APPLICATIONS

This application claims priority to U.S. Provisional Application No. 63/453,810, filed Mar. 22, 2023, entitled "High Aspect Ratio Driver," the entirety of which is herein incorporated by reference.

BACKGROUND

Electronic devices, such as televisions, smart-home devices, and the like are becoming increasingly compact. For example, electronic devices are often equipped with greater functionalities contained in a smaller volume. Unfortunately, the performance of some components is sacrificed and/or components are unavailable for these smaller volumes. Speakers, for example, are often relatively large in size and therefore are ill-suited for such applications. As an example, speakers are traditionally circular in shape, however, for speakers with a high aspect ratio, there is limited space for such designs.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIGS. 6A-6D illustrate an example frame of the audio transducer of FIG. 1, according to examples of the present disclosure.

DETAILED DESCRIPTION

Figure 1:
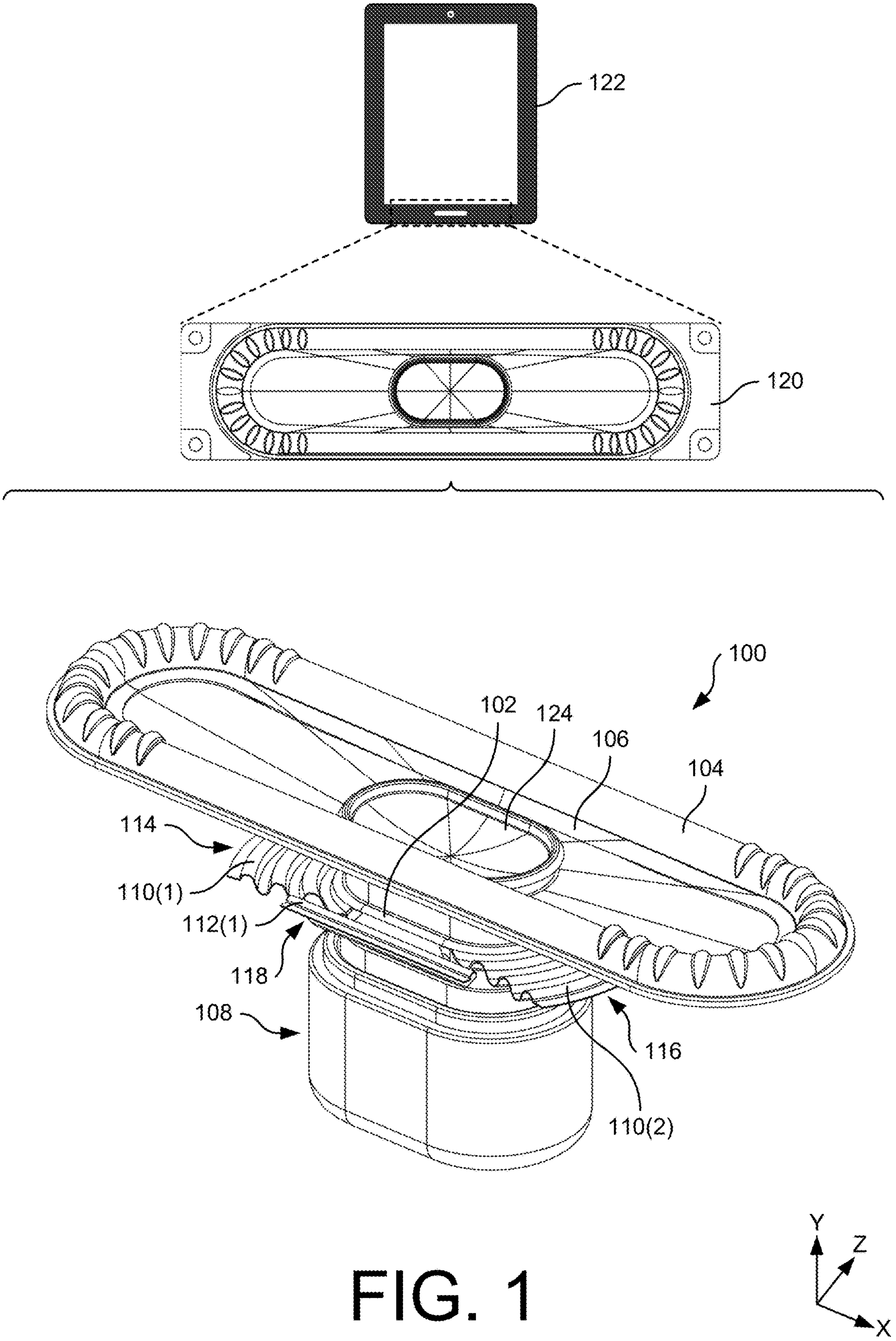
FIG. 1 illustrates an example speaker having an audio transducer with an example butterfly suspension element that provides dynamic support to one or more components of the audio transducer, according to examples of the present disclosure.

This application is directed, at least in part, to a suspension system for an audio transducer of a speaker, according to examples of the present disclosure. In some instances, the suspension system includes a top suspension, such as a surround, cone, dust cap, and a bottom suspension, having a suspension element. In some instances, the suspension element may include different types of corrugations for providing suspension and stabilizing moving parts of the audio transducer, such as a coil, bobbin, diaphragm assembly, dust cap, and so forth. For example, the suspension element may include first corrugation(s) disposed at the ends of the suspension element (e.g., longitudinal ends) and second corrugation(s) disposed along the sides of the suspension element (e.g., lateral sides). This type of bottom suspension may be referred to as a "butterfly suspension" or a "butterfly suspension element" as the form factor may resemble a butterfly. In some instances, the first corrugation(s) and the second corrugation(s) may be differently shaped and/or sized. Additionally, or alternatively, the first corrugation(s) may include a different amount (e.g., number) of corrugations as compared to the second corrugation(s), vice versa. The use of the first corrugation(s) and the second corrugation(s) may be used to provide desired excursion in a speaker with high-aspect ratios.

The suspension element may be manufactured as a flexible material, such as cloth (e.g., Conex, Nomex, or cotton), rubber, silicone, synthetics (e.g., poly-cotton), etc. In some instances, the first corrugation(s) and/or the second corrugation(s) may represent fluting, waves, ridges, etc. formed within the suspension element to provide excursion. For example, in some instances, the first corrugation(s) and/or the second corrugation(s) may be formed via press-hardening, stamping, etc. In some instances, the suspension element may be non-circular. For example, the suspension element may include a rectangular, ovular, etc. profile.

In some instances, the suspension element may include or be defined by different sections (e.g., segments, portions, etc.). For example, a first section may be disposed at a first end of the suspension element, a second section may be disposed at a second end of the suspension element, opposite the first end, a third section may be disposed at a first side of the suspension element, and a fourth section may be disposed at a second side of the suspension element, opposite the first side. In some instances, the first section, the second section, the third section, and/or the fourth section may be differently or similarly sized. In some instances, the first section and the second section are identical, while the third section and the fourth section are identical.

The first corrugation(s) may be disposed on the first section and the second section. The second corrugation(s) may be disposed on the third section and the fourth section. In some instances, slots (e.g., slits, channels, void, etc.) may be disposed between the sections. For example, a first slot may be disposed between the first section and the third section, a second slot may be disposed between the second section and the third section, a third slot may be disposed between the second section and the fourth section, and a fourth slot may be disposed between the first section and the fourth section. However, although described as including separate sections, the suspension element may represent a continuous piece of material at the interior and/or the outer boundary to ensure that components of the audio transducer remain aligned and balanced. Additionally, to reduce a tearing of the suspension element, the slots may include rounded corners.

The first corrugation(s) and the second corrugation(s) include a depth (e.g., amplitude, disposed from peak to valley, etc.) and a width (e.g., pitch, wavelength, disposed from peak to peak, valley to valley, etc.). The first corrugation(s) include a first depth and a first width, and the second corrugation(s) include a second depth and a second width. The first depth may be similar or different than the second depth, and/or the first width may be similar or different than the second width. In some instances, the first width and the first depth may be consistent (i.e., the same) across the first corrugation(s), and/or the second width and the second depth may be consistent (i.e., the same) across the second corrugation(s). However, in some instances, the first corrugation(s) may include different widths and/or depths as compared to one another, and/or the second corrugations may include different widths and/or depths as compared to one another.

Any number of first corrugation(s) and second corrugation(s) may be used, and/or a number of the first corrugation(s) may be the same as, or different than, the number of second corrugation(s). In some instances, the first corrugation(s) and the second corrugation(s) may be in the same plane or different plane, depending on the stiffness, excursion, and linearity of the audio transducer. Additionally, in some instances, the first depth may be different than the second depth, and/or the first width and the second width may be different depending upon stiffness and linearity of the audio transducer.

In some instances, the suspension element includes a first axis disposed along a lengthwise direction of the suspension element and a second axis disposed along a widthwise direction of the suspension element. The first axis may represent a long axis of the suspension element, while the second axis may represent a short axis of the suspension element. The first section and the second section may be disposed along the first axis, while the third section and the fourth section may be disposed along the second axis. In some instances, the suspension element may be symmetrical about the first axis and/or the second axis. The first axis and the second axis may be oriented orthogonally to one another. Given the use of the suspension element in high-aspect ratios speakers, the speaker may have limited space along the second axis to provide suspension. As such, in some instances, the number of first corrugation(s) disposed along the first section and the second section may be greater than the number of second corrugation(s) disposed along the third section and the fourth section.

The suspension element may also include flanges that are used to couple the suspension element to a frame (e.g., basket) of the audio transducer. For example, flanges of the suspension element may be disposed on shelves (e.g., lip, flange, etc.) formed by the frame. In some instances, the flanges are disposed along the first section, the second section, the third section, and/or the fourth section. In some instances, the flanges may be in the same plane or different plane, depending on the stiffness, excursion, and linearity of the audio transducer.

In some instances, the audio transducer, including the suspension element, may find use with a full-range audio transducer (e.g., from approximately 150 Hz to 20 kHz). However, the suspension element may be used in other types of audio transducers such as woofers, midrange audio transducers, tweeters, etc. Additionally, in some instances, the audio transducer may have a size of approximately 25 mm (e.g., width)×100 mm (e.g., length). The suspension element may also include other features, such as a channel for accommodating a voice coil of the transducer.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example audio transducer 100 for a speaker, where the audio transducer may have a suspension element 102, according to aspects of the present disclosure. In some instances, the suspension element 102 may be alternatively referred to as a "butterfly suspension element," as its shape may resemble a butterfly. The audio transducer 100 is also shown including a surround 104 coupled to a cone 106. The audio transducer may include a dust cap 124. Collectively, the suspension element 102 and the surround 104 may provide suspension to moving components of the audio transducer 100, such as the cone 106 and the dust cap 124, to allow sound to be generated by the audio transducer 100. In some instances, the suspension element 102 and the surround 104 may be considered a suspension system of the audio transducer 100. The suspension element 102 and the surround 104 may also ensure that an actuator 108 and the cone 106 remain aligned and balanced. As shown, and as will be discussed herein, the suspension element 102 may be disposed around a former of the actuator 108.

As will be explained herein, the suspension element 102 may include corrugations to provide suspension to the audio transducer 100. The corrugations may be disposed along different sections of the suspension element 102, and the corrugations disposed along the sections may be different than one another depending upon the stiffness, excursion, and linearity desired of the audio transducer 100, and the housing space in the audio transducer 100. For example, the suspension element 102 may include first corrugation(s) 110 and second corrugation(s) 112. An amount of the first corrugation(s) 110 and second corrugation(s) 112, a shape of the first corrugation(s) 110 and second corrugation(s) 112, a size of the first corrugation(s) 110 and second corrugation(s) 112, etc. may be different across the sections. For example, a first section 114 of the suspension element 102 may include first corrugation(s) 110(1) and a second section 116 of the suspension element 102 may include first corrugation(s) 110(2). A third section 118 of the suspension element 102 may include second corrugation(s) 112(1) and a fourth section of the suspension element 102, opposite the third section, may include second corrugation(s) 112(2). The first corrugation(s) 110(1) and the first corrugation(s) 110(2) may be similar, but different than the second corrugation(s)

112(1) and the second corrugation(s) 112(2). The second corrugations(s) 112(1) and the second corrugation(s) 112(2) may be similar.

The suspension element 102 and the surround 104 may be coupled to a frame 120 (e.g., basket). Additionally, the suspension element 102 and the surround 104 may serve to couple the cone 106 to the frame 120. In some instances, the audio transducer 100 may have a high-aspect ratio. In some instances, the audio transducer 100 may find use within a device 122, which may be representative of any type of device such as a tablet, television, smart-home device, etc.

Figure 2:
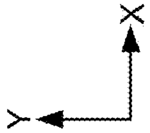
FIG. 2 illustrates a side view of the audio transducer of FIG. 1, showing the suspension element coupled to an example housing, according to examples of the present disclosure.
Figure 2:
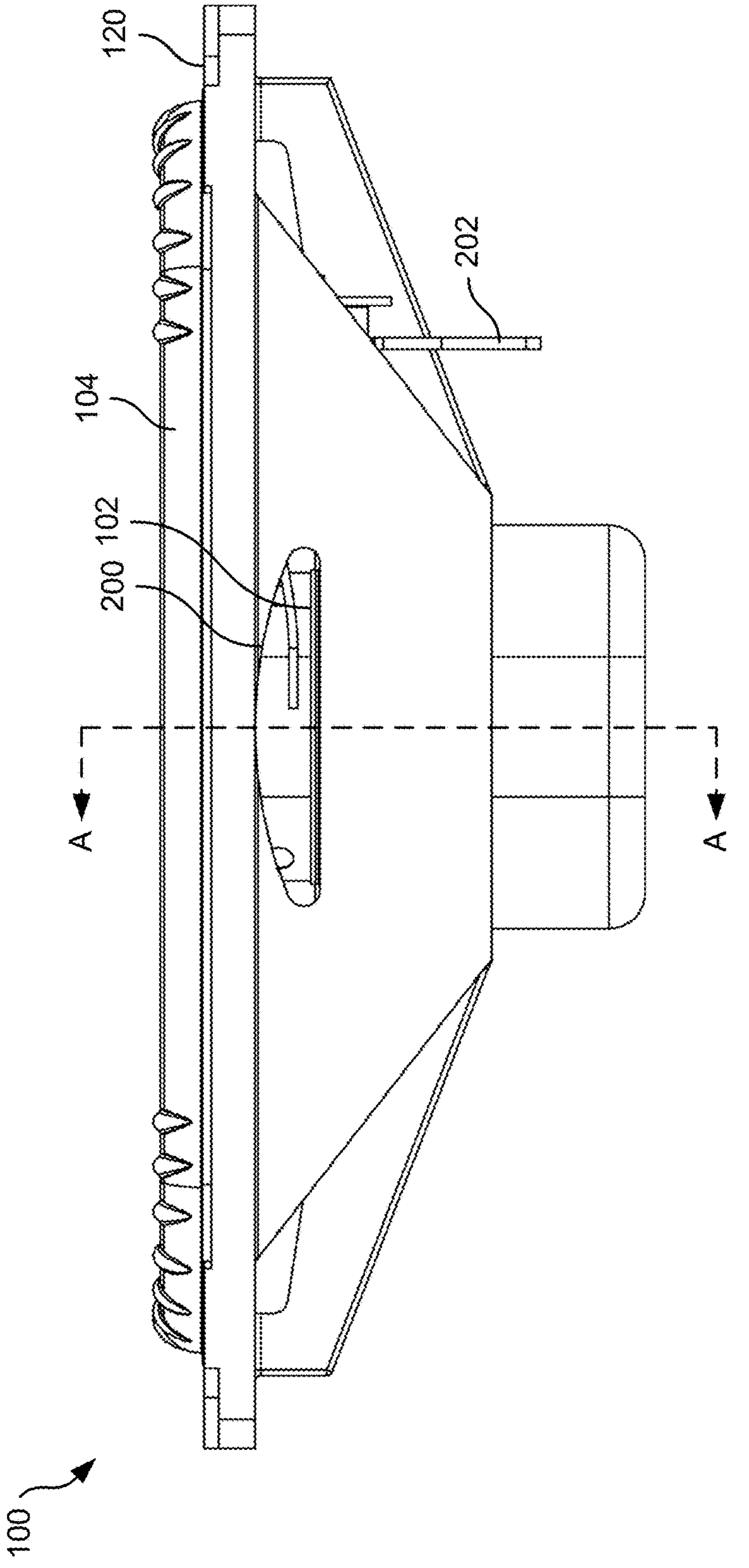

FIG. 2 illustrates the audio transducer 100 coupled to the frame 120, according to examples of the present disclosure. The frame 120 may include a cavity that at least partially receives other parts of the audio transducer 100. For example, components of the audio transducer 100, such as the suspension element 102, may be at least partially disposed within the cavity the frame 120. As will be discussed herein, the frame 120 may define one or more receptacles 200 that include shelves on which the suspension element 102 is disposed. For example, the suspension element 102 may include flanges that rest on the shelves. The surround 104, as shown, may be disposed external to the cavity.

The audio transducer 100 may include terminals 202 for providing electrical power to the audio transducer 100. In some instances, the frame 120 may be manufactured from plastics, metals, etc., and may be manufactured using any suitable manufacturing techniques, such as injection molding.

Figure 3:
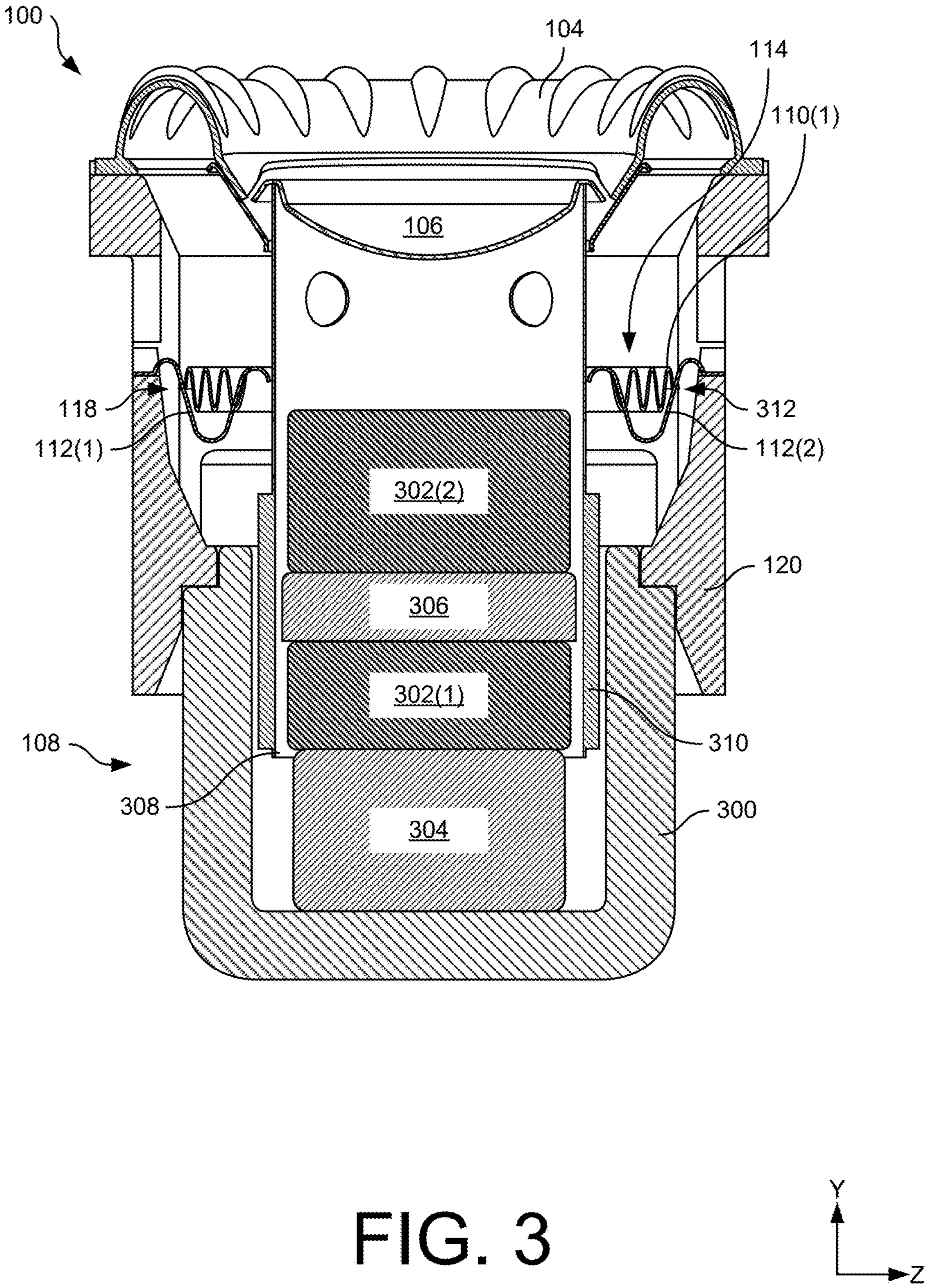
FIG. 3 illustrates a cross-sectional view of the audio transducer of FIG. 1, taken along line A-A of FIG. 2, according to examples of the present disclosure.

FIG. 3 illustrates a cross-sectional view of the audio transducer 100, taken along line A-A of FIG. 2, according to examples of the present disclosure. The actuator 108 may include a yoke 300 (e.g., housing). The yoke 300 may be coupled to the frame 120. The actuator 108 may include one or more magnetic elements 302, such as a first magnetic element 302(1) and a second magnetic element 302(2). A first washer 304 may be disposed between the first magnetic element 302(1) and the yoke 300, and a second washer 306 may be disposed between the first magnetic element 302(1) and the second magnetic element 302(2).

A former 308 (e.g., bobbin) may be at least partially disposed around the magnetic elements 302. Additionally, a coil 310 (e.g., voice coil) may be disposed on the former 308. The coil 310 may be disposed around the magnetic elements 302. As shown, the former 308 and/or the coil 310 may be at least partially disposed in the yoke 300.

The first section 114 of the suspension element 102 includes the first corrugations 110(1). The third section 118 includes the first corrugations 112(1) and a fourth section 312 includes second corrugation(s) 112(2). The suspension element 102 may extend between the former 308 and sidewalls of the frame 120, for example, to provide suspension to the former 308 (e.g., in the Y-direction). The suspension element 102 may define an opening in which the former 308 is disposed. In some instances, the suspension element 102 may be coupled to the former 308 (e.g., using adhesives, press-fit, etc.). The former 308 also couples to the cone 106. The surround 104 may also be coupled to the frame 120.

Figure 4A:
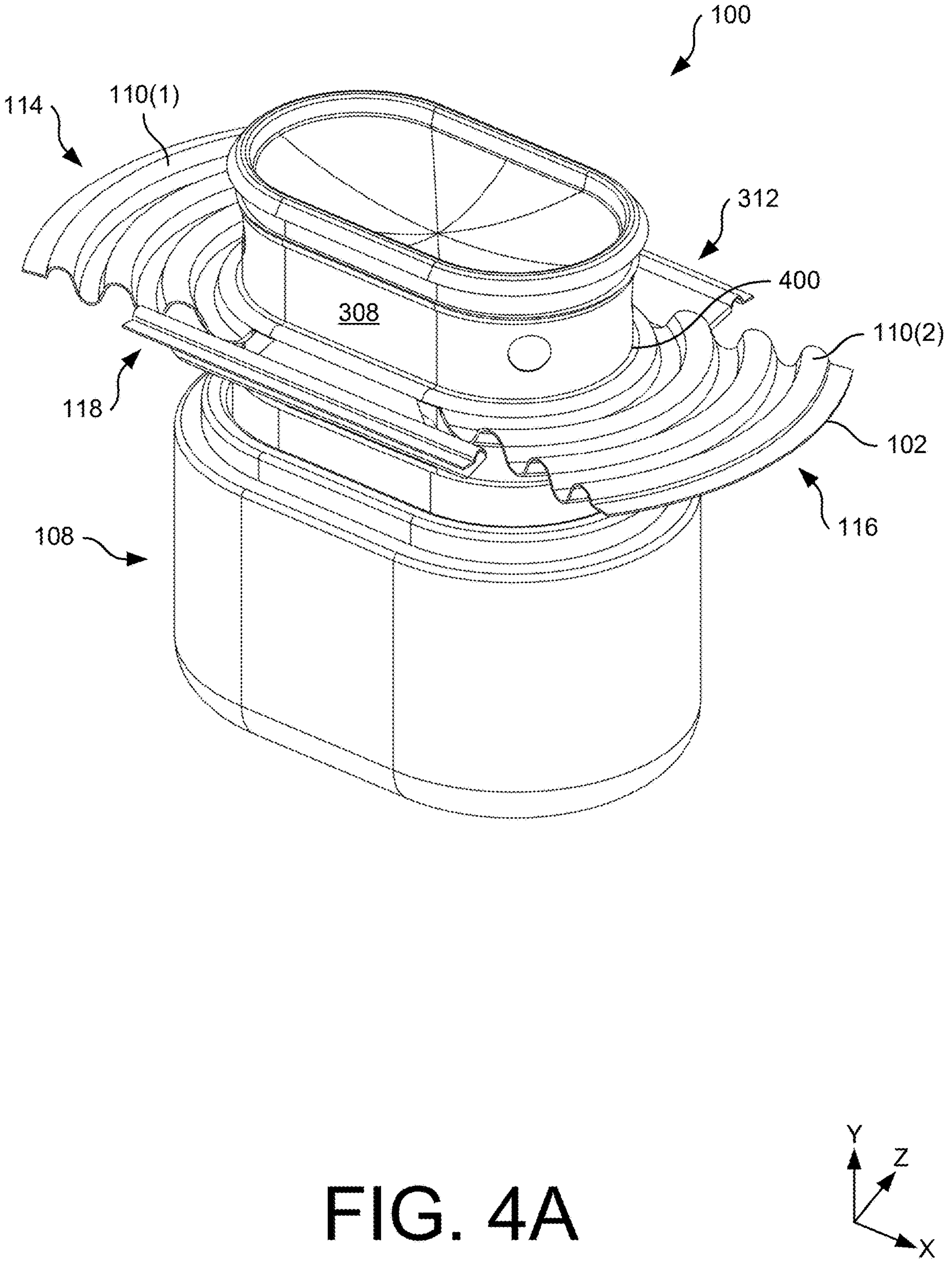
FIG. 4A illustrates an isometric view of the audio transducer of FIG. 1, showing the suspension element coupled to example components of the audio transducer, according to examples of the present disclosure.
Figure 4B:
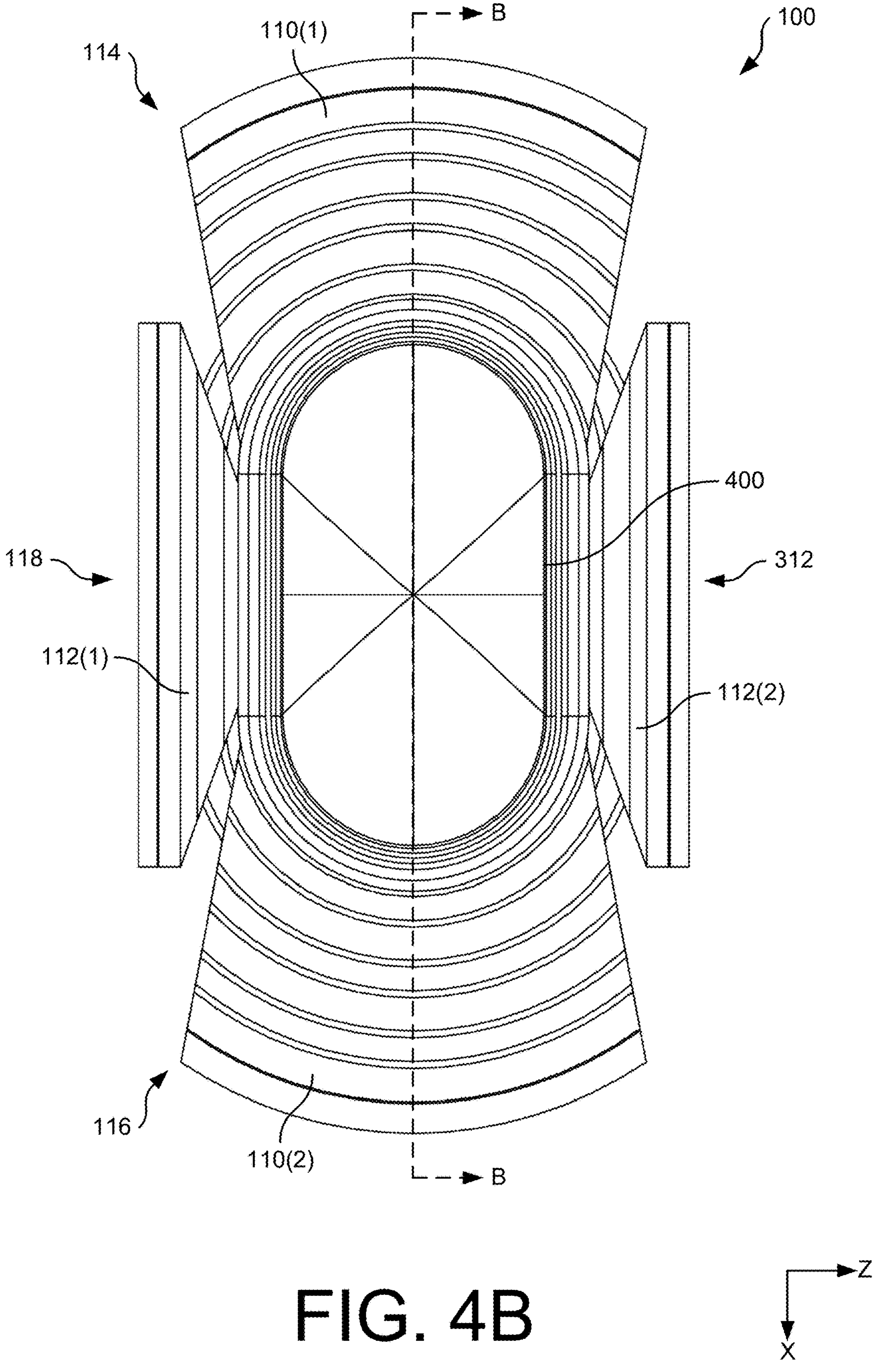
FIG. 4B illustrates a top view of the audio transducer of FIG. 1, showing the suspension element coupled to example components of the audio transducer, according to examples of the present disclosure.
Figure 4C:
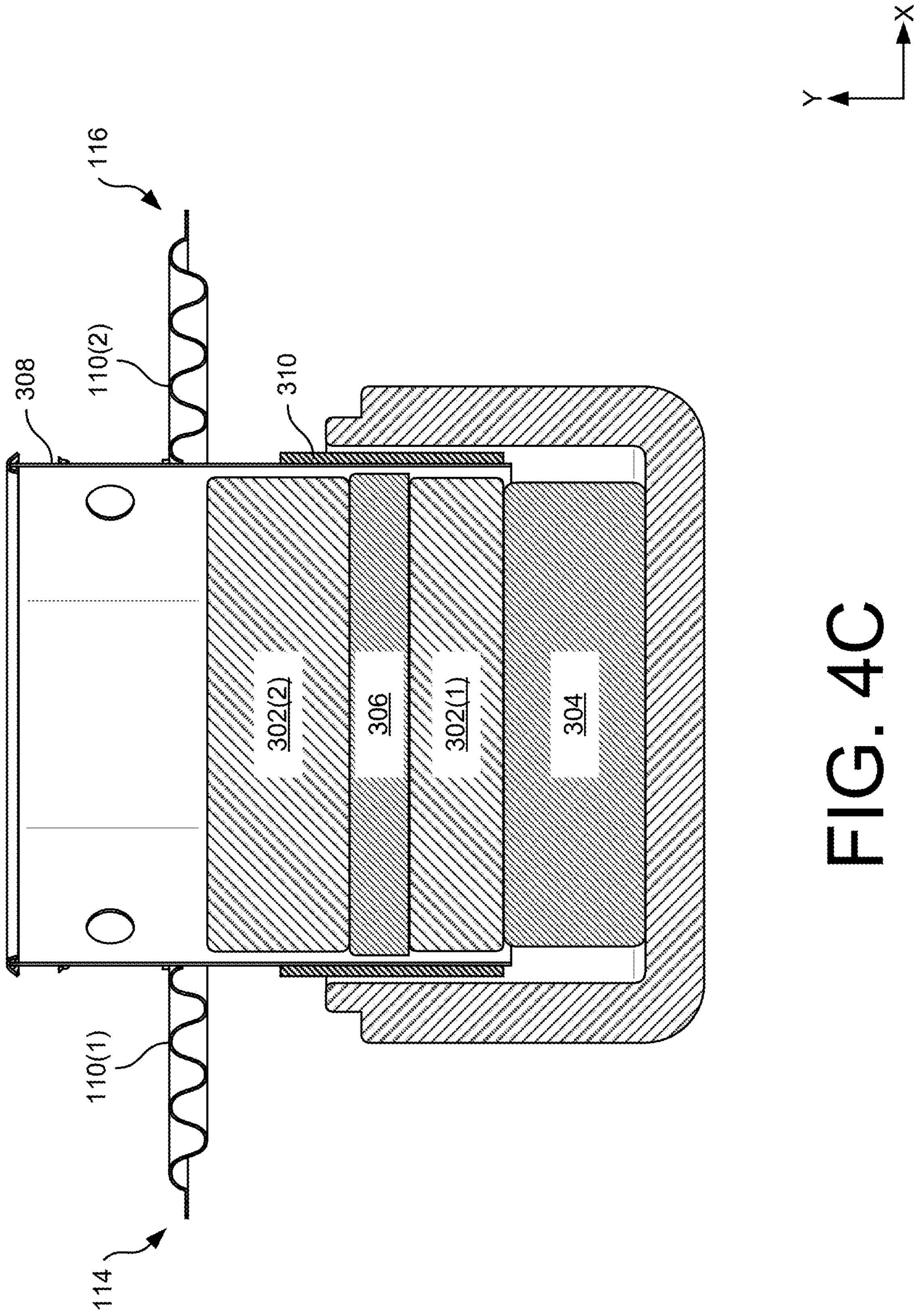
FIG. 4C illustrates a partial cross-sectional view of the audio transducer of FIG. 1, taken along line B-B of FIG. 4B, showing the suspension element coupled to example components of the audio transducer, according to examples of the present disclosure.

FIGS. 4A-4C illustrates a coupling of the suspension element 102 to the actuator 108, such as the former 308, according to examples of the present disclosure. The suspension element 102 includes the first section 114, the second section 116, the third section 118, and the fourth section 312. The first section 114 includes the first corrugation(s) 110(1) and the second section 116 includes the first corrugation(s) 110(2). The first section 114 may be at least partially disposed on a first side of the former 308, while the second section 116 may be at least partially disposed on a second side of the former 308, opposite the first side (e.g., spaced apart in the X-direction). Moreover, as shown, the first section 114 and the second section 116 may include a curvature (e.g., angular length) that additionally or alternatively are disposed on a third side and a fourth side of the former (e.g., spaced apart in the Z-direction). The third section 118 may be disposed on the third side of the former 308, while the fourth section 312 may be disposed on the fourth side of the former 308.

The suspension element 102 defines an opening 400 through which the former 308 is at least partially disposed. The opening 400 may be disposed between the first section 114, the second section 116, the third section 118, and the fourth section 312. The coil 310 may be disposed beneath (e.g., in the Y-direction) the suspension element 102, while the cone 106, for example, may be disposed above (e.g., in the Y-direction) the suspension element 102. Stated alternatively, in some instances, the suspension element 102 may be coupled to the former 308, at a location between the cone 106 and the coil 310. In some instances, the former may be coupled to the former 308 (e.g., adhesives).

Figure 5A:
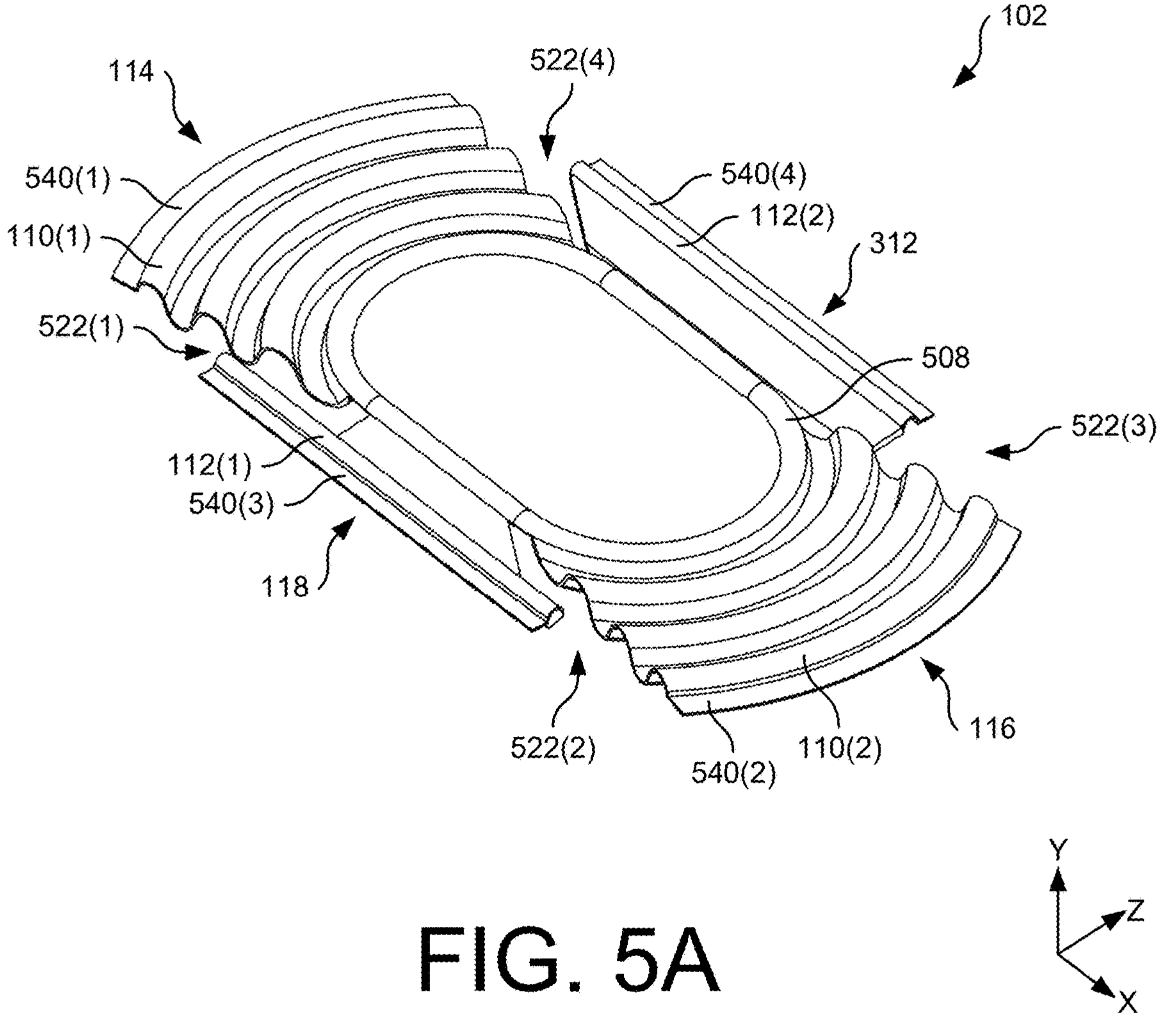
FIGS. 5A-5F illustrate various views of the suspension element of FIG. 1, according to examples of the present disclosure.
Figure 5B:
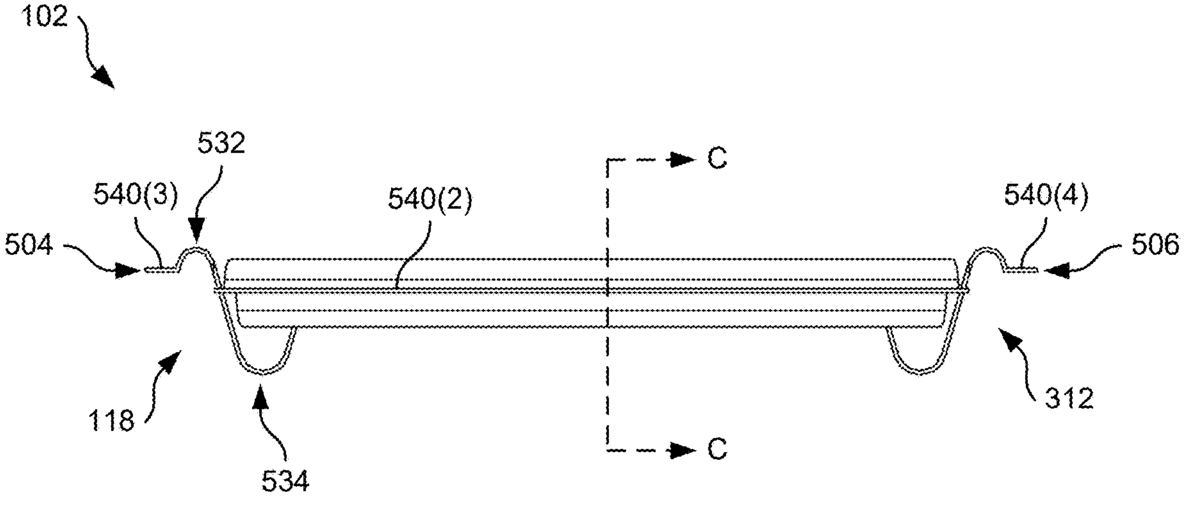
Figure 5C:
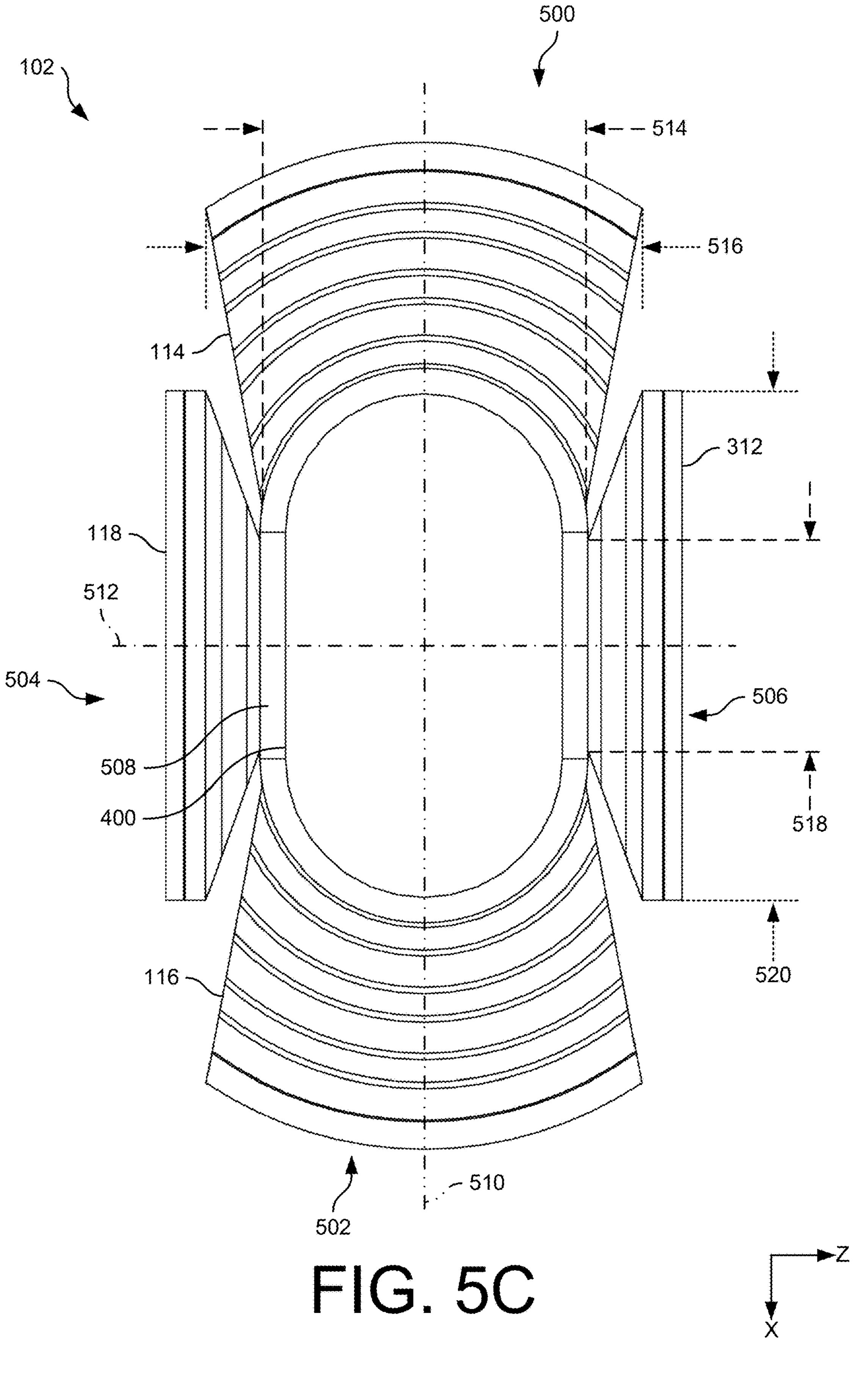
Figure 5D:
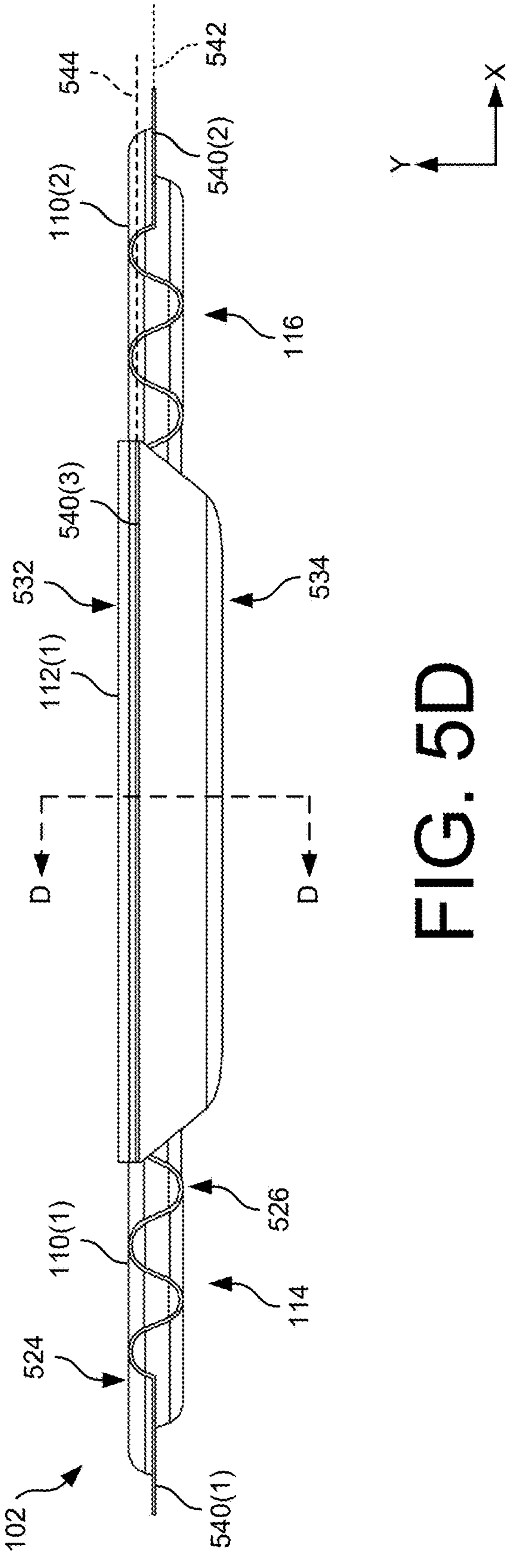
Figure 5E:
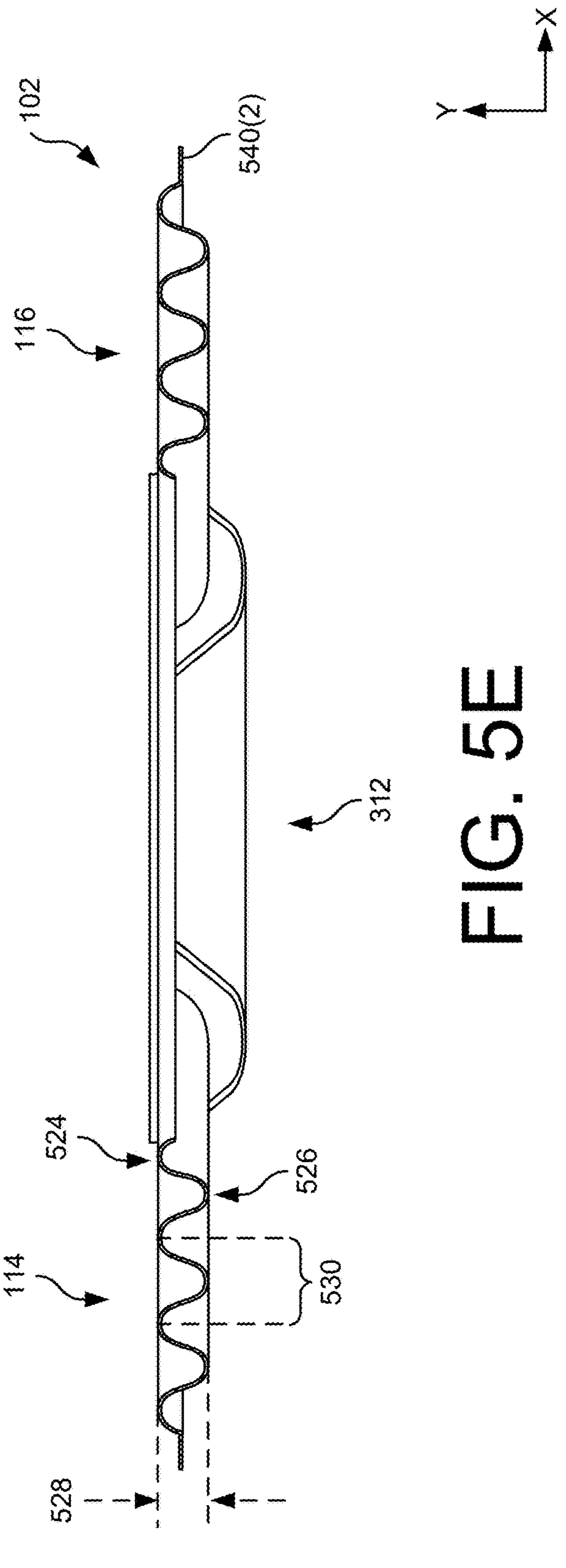
Figure 5F:
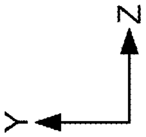
Figure 5F:
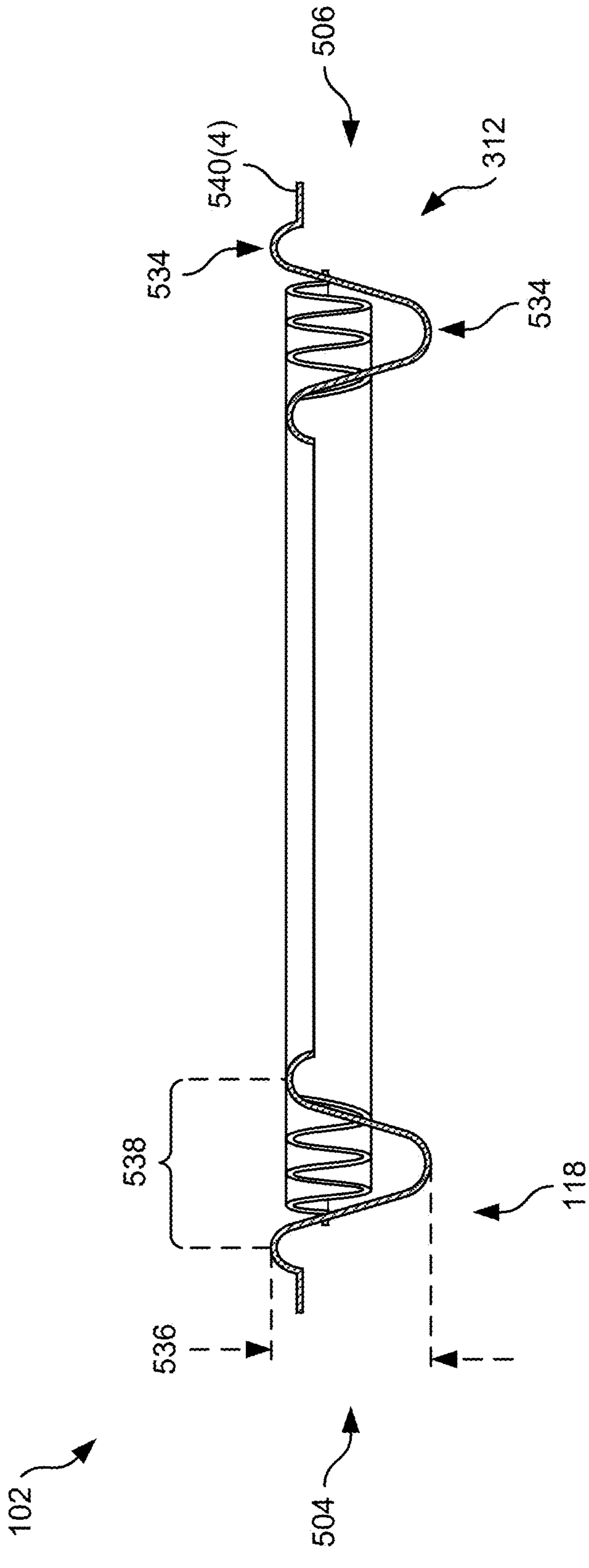
Figure 6A:
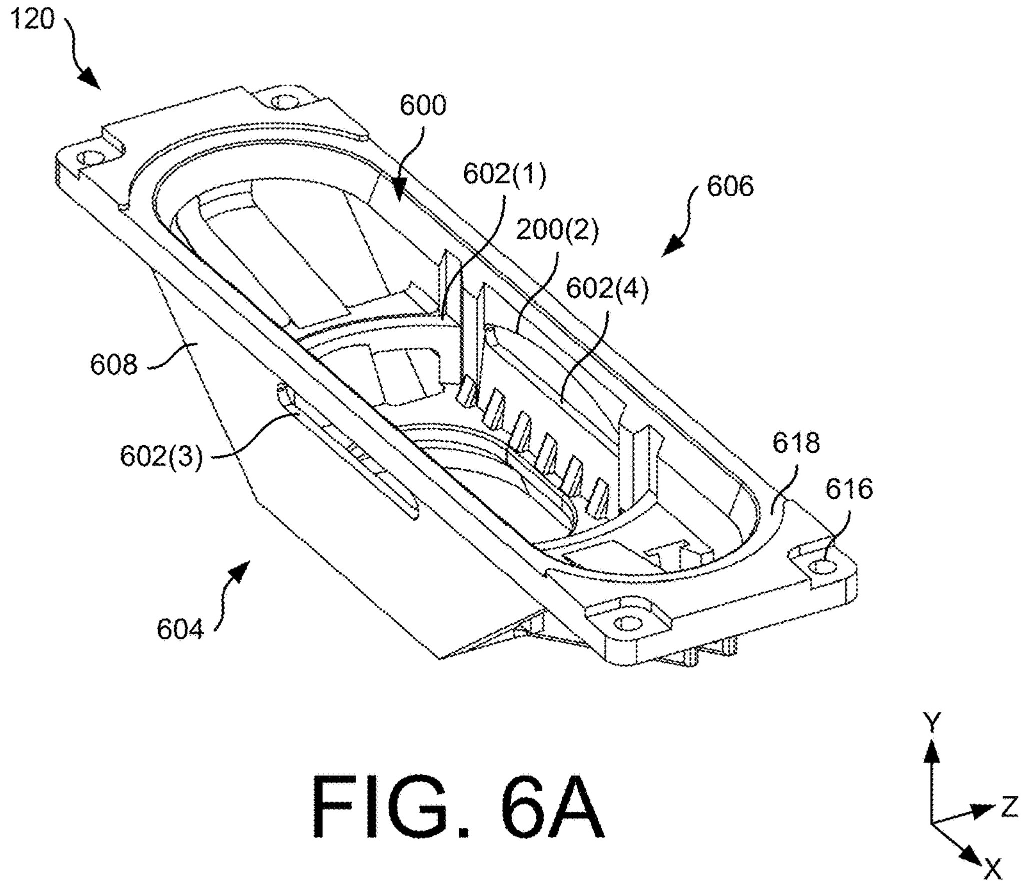
Figure 6B:
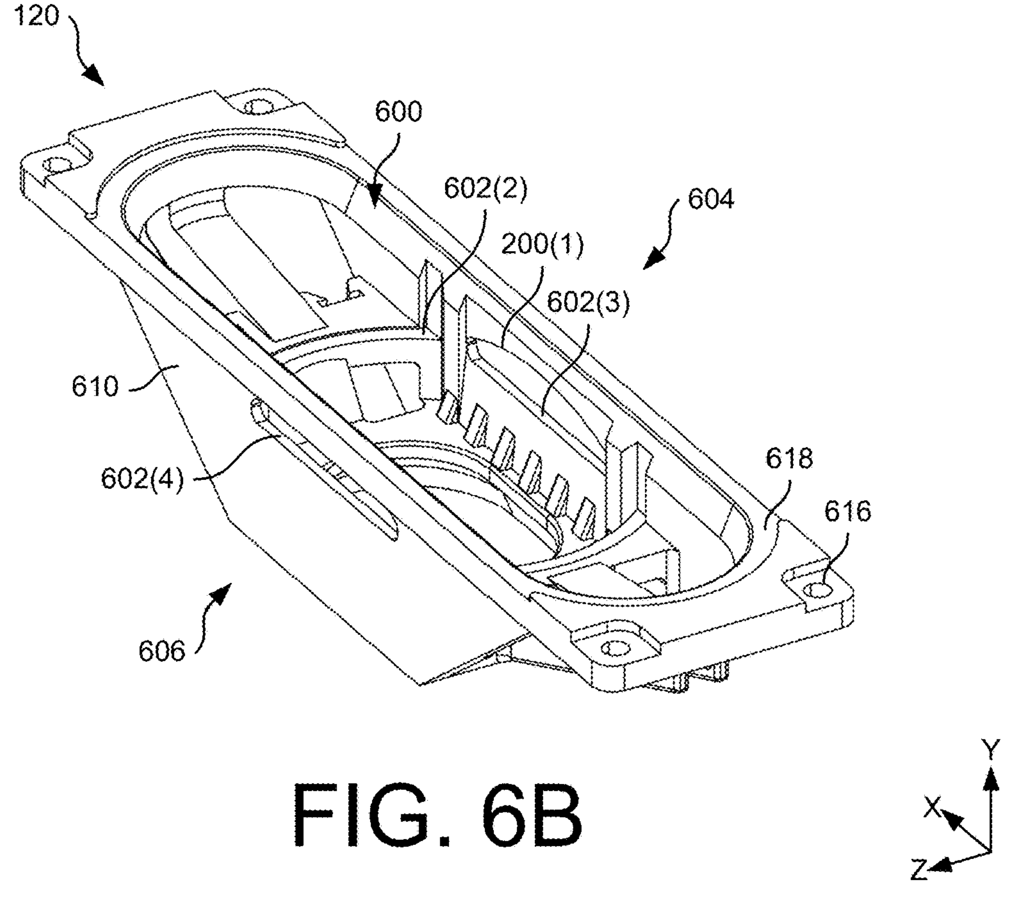
Figure 6D:
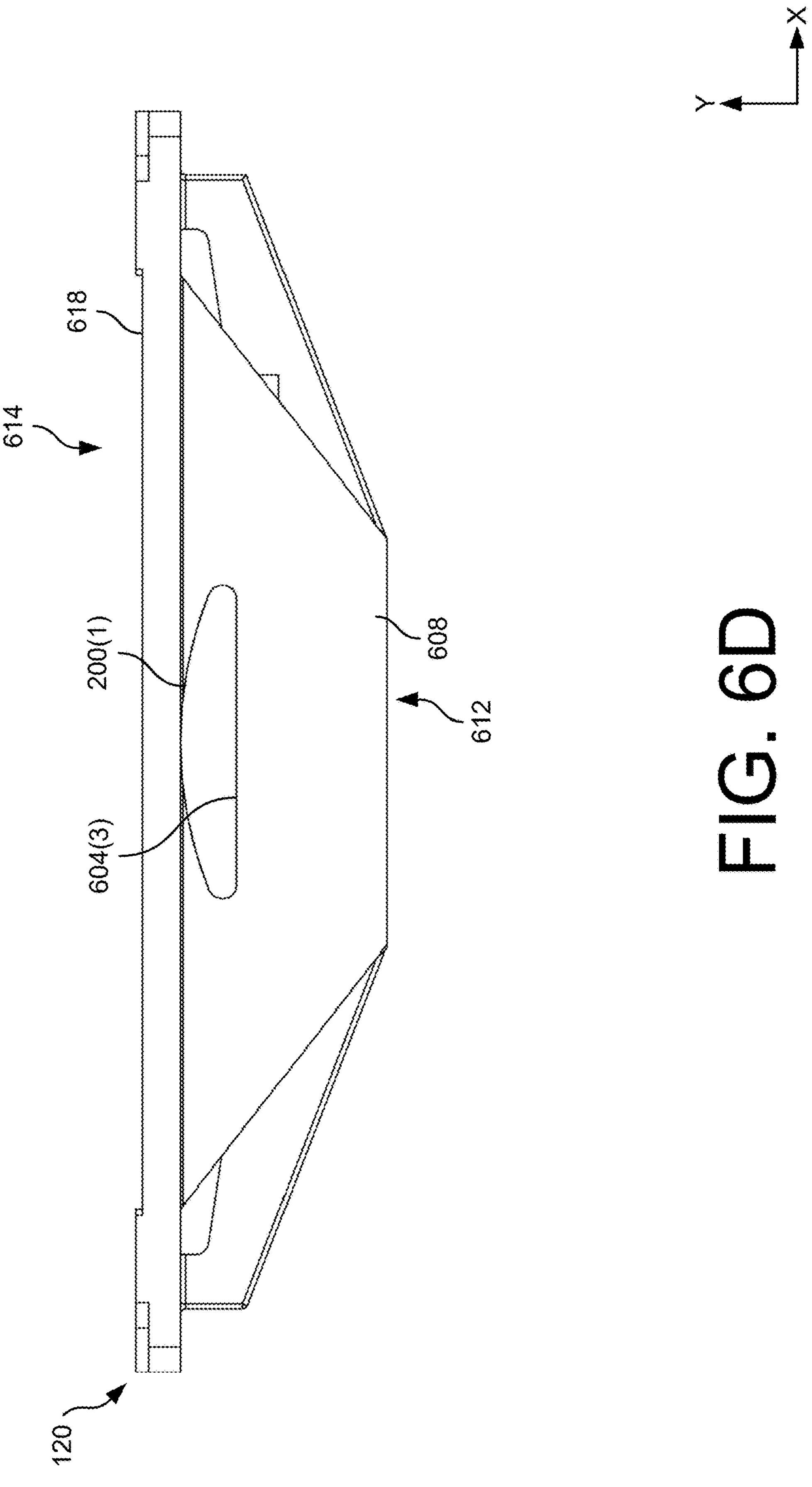
Figure 7A:
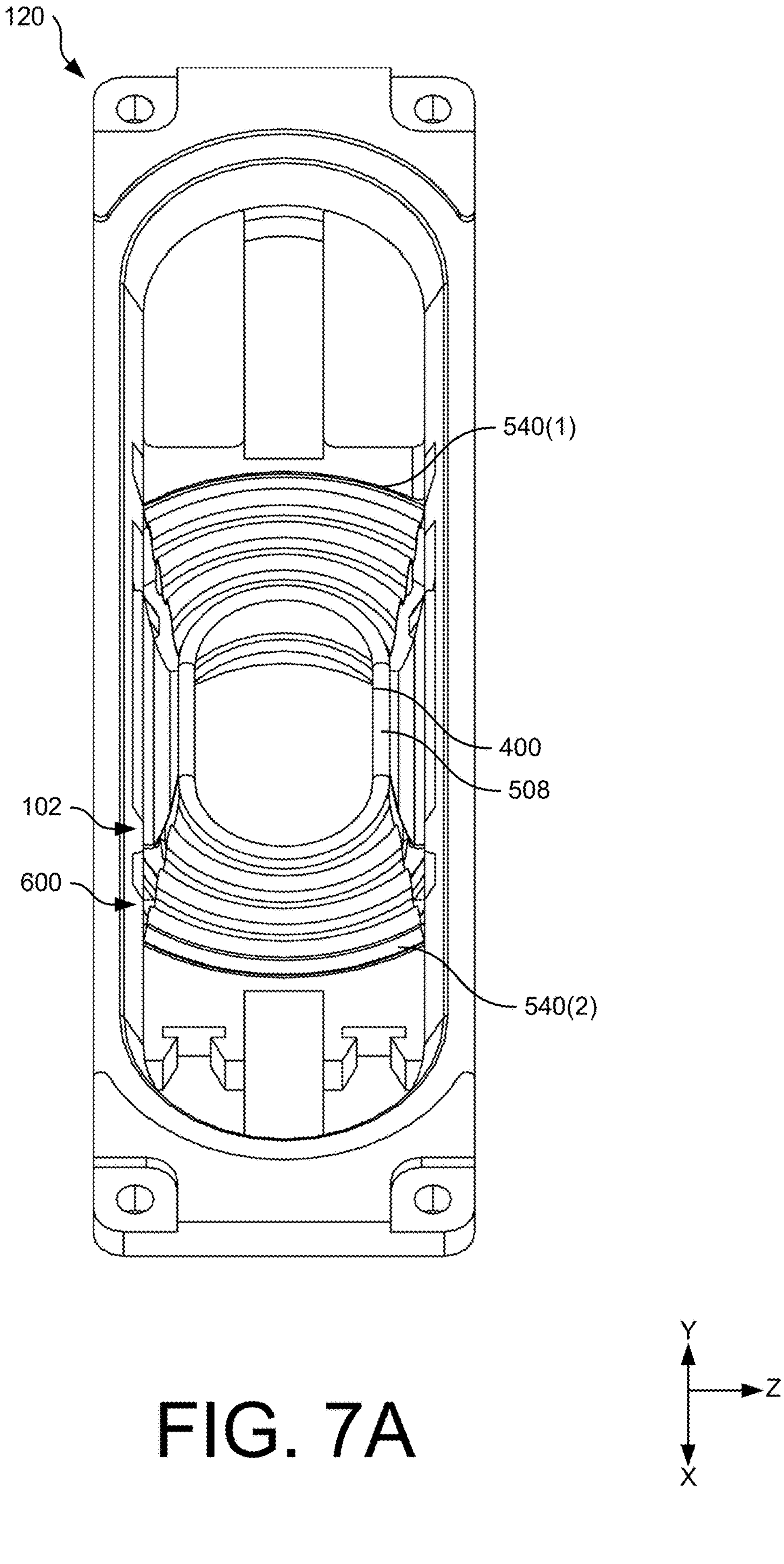
FIGS. 7A-7D illustrate a coupling of the suspension element of FIG. 1 to the frame of FIGS. 6A-6D, according to examples of the present disclosure.
Figure 7B:
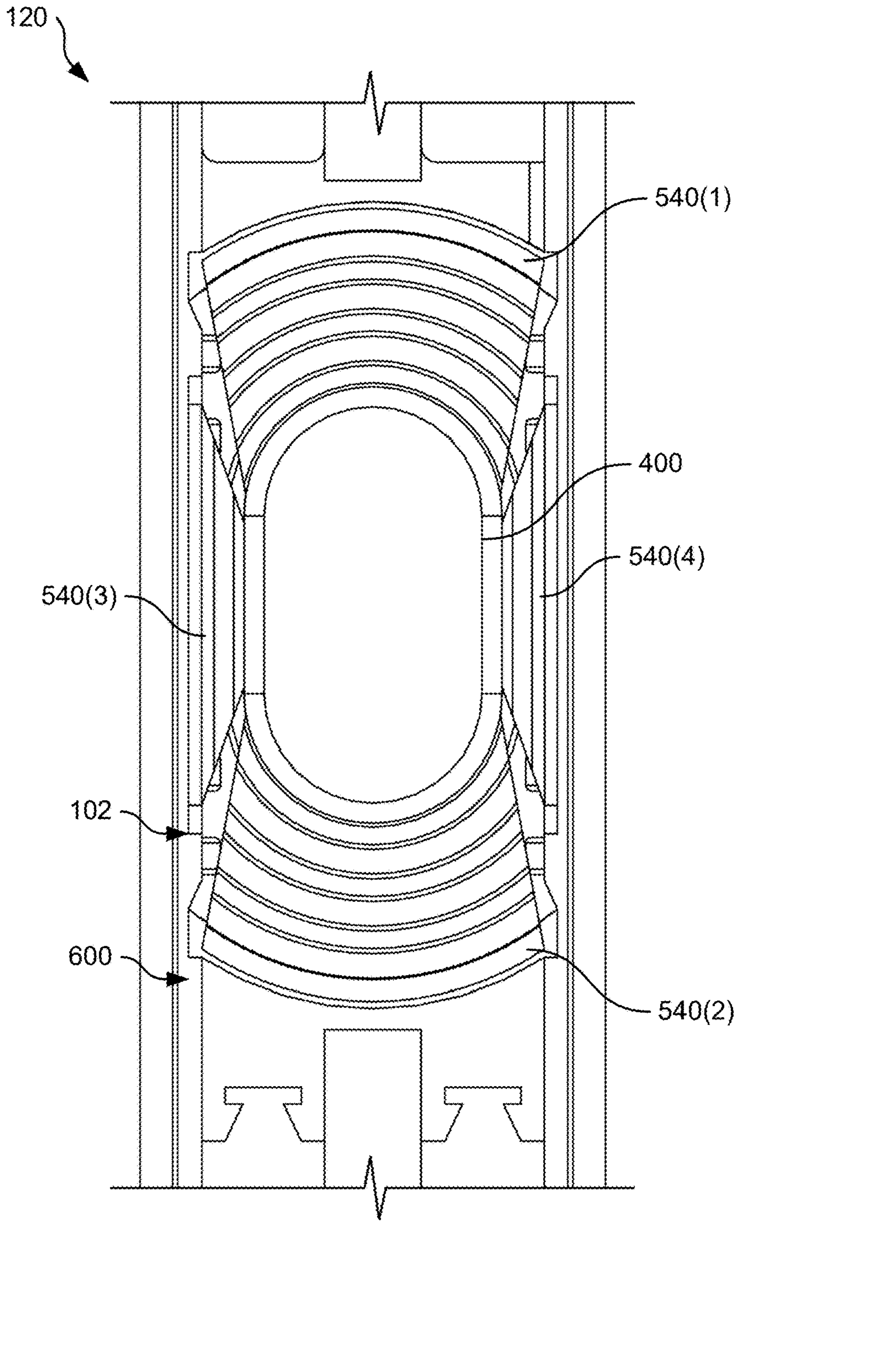
Figure 7C:
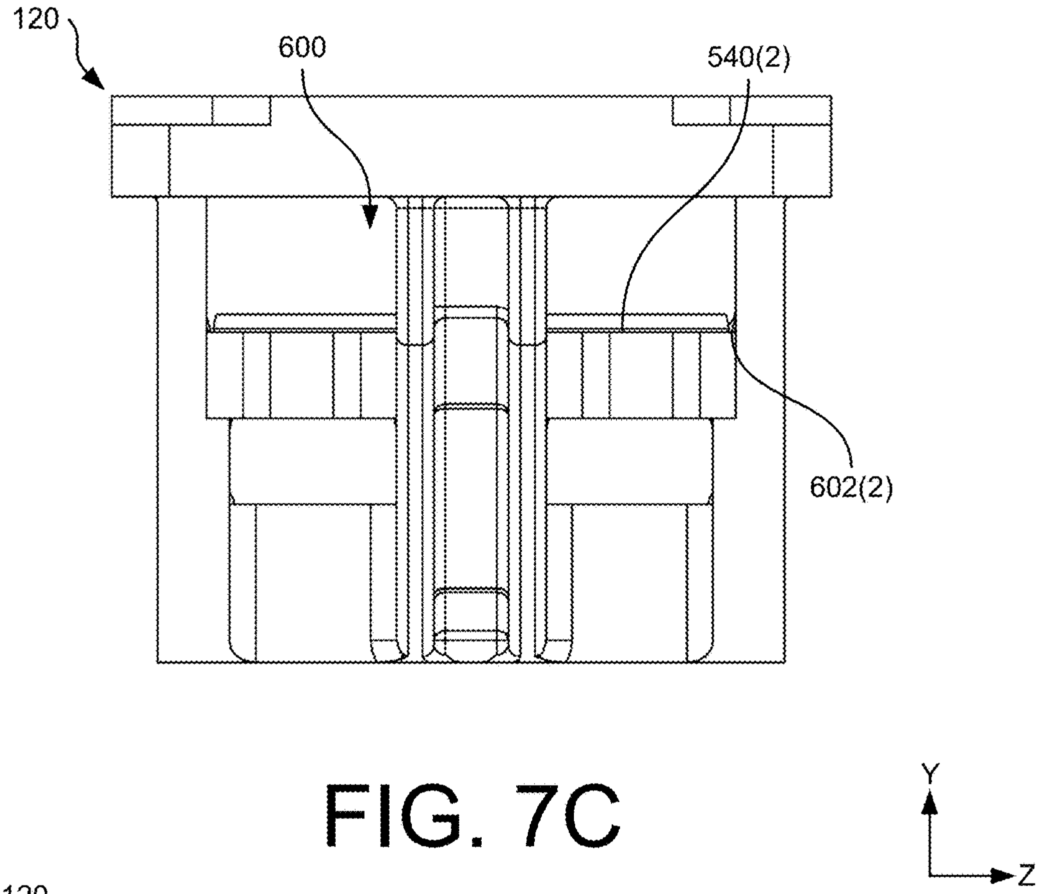
Figure 7D:
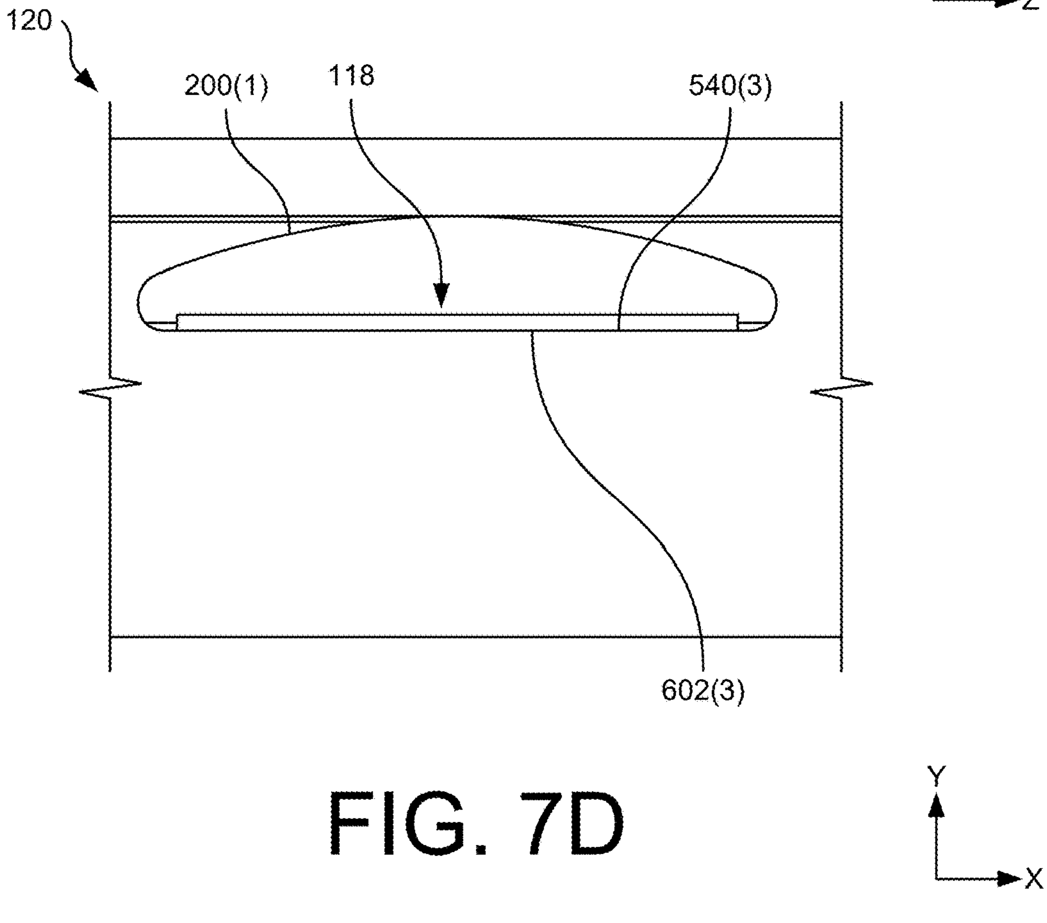

FIGS. 5A-5F illustrate the suspension element 102, according to examples of the present disclosure, according to examples of the present disclosure. FIG. 5E illustrates a cross-sectional view of the suspension element 102 taken along line C-C of FIG. 5B, and FIG. 5F illustrates a cross-sectional view of the suspension element 102 taken along line D-D of FIG. 5D. The suspension element 102 may be manufactured with a flexible material, such as cloth (e.g., cotton), rubber, silicone, synthetics (e.g., poly-cotton), etc. In some instances, the suspension element 102 may include a body that defines the first corrugation(s) 110 and/or the second corrugation(s) 112, which may represent fluting, waves, ridges, etc. formed within the suspension element 102 to provide excursion to the audio transducer 100. For example, in some instances, the first corrugation(s) 110 and/or the second corrugation(s) 112 may be formed via thermal forming, press-hardening, stamping, etc.

In some instances, the suspension element 102 may include or be defined by different sections (e.g., segments, portions, etc.). For example, the first section 114 may be disposed at a first end 500 of the suspension element 102, a second section 116 may be disposed at a second end 502 of the suspension element 102, opposite the first end (e.g., spaced apart in the X-direction), a third section 118 may be disposed at a first side 504 of the suspension element 102, and a fourth section 312 may be disposed at a second side 506 of the suspension element 102, opposite the first side 504 (e.g., in the Z-direction). However, although described as including separate sections, the suspension element 102 may represent a continuous piece of material (e.g., unibody, unitary, etc.) to ensure that components of the audio transducer 100 remain aligned and balanced. For example, in some instances, an annulus 508 of the suspension element 102 may couple the first section 114, the second section 116, the third section 118, and the fourth section 312 together.

In some instances, the suspension element 102 includes a first axis 510 disposed along a lengthwise direction of the suspension element 102, between the first end 500 and the second end 502 (e.g., in the X-direction). The suspension element 102 may also include a second axis 512 disposed along a widthwise direction of the suspension element 102, between the first side 504 and the second side 506 (e.g., in the Z-direction). The first axis 510 may represent a long axis of the suspension element 102, while the second axis 512 may represent a short axis of the suspension element 102. In some instances, the first axis 510 is oriented orthogonally to the second axis 512. The first section 114 and the second section 116 may be disposed along the first axis 510, while the third section 118 and the fourth section 312 may be disposed along the second axis 512. In some instances, the suspension element 102 may be symmetrical about the first axis 510 and/or the second axis 512.

In some instances, the first section 114, the second section 116, the third section 118, and/or the fourth section 312 may be differently or similarly sized. Additionally, or alternatively, in some instances, the first section 114, the second section 116, the third section 118, and/or the fourth section 312 may be differently or similarly shaped. For example, as shown, the first section 114 may curve along the first end 500. In some instances, the first section 114 may be disposed at least partially along the first side 504 and the second side 506. Additionally, the second section 116 may curve along the second end 502. In some instances, the second section 116 may be disposed at least partially along the first side 504 and the second side 506. The third section 118 may be disposed along the first side 504, and the fourth section 312 may be disposed along the second side 506.

The first section 114 and the second section 116 may taper, diverge, etc. along first axis 510, so as to take a triangular, wedge, or sector shape. For example, proximate to the opening 400 or at an intersection with the annulus 508, the first section 114 and the second section 116 may include a first dimension 514. In a direction along the first axis 510, and spaced apart from the opening 400, the first section 114 and the second section 116 may include a second dimension 516. The second dimension 516 may be greater than the first dimension 514. As such, in some instances, in a direction along the first axis 510, edges or sides of the first section 114 and the second section 116 may extend in a direction away from the first axis 510 (e.g., in the Z-direction). Stated alternatively, from the opening 400 to the first end 500, the first section 114 may extend outward, and from the opening 400 to the second end 502, the second section 116 may extend outward. In some instances, the first corrugation(s) 110(1) and the first corrugation(s) 110(2) may be disposed along an arc path between ends, or sides, of the first section 114 and the second section 116, respectively. In doing so, the first corrugation(s) 110(1) and the first corrugation(s) 110(2) may curve, or follow a curved profile.

Similarly, in some instances, proximate to the opening 400 or at an intersection with the annulus 508, the third section 118 and the fourth section 312 may include a third dimension 518. In a direction along the second axis 512, spaced apart from the opening 400, the third section 118 and the fourth section 312 may include a fourth dimension 520. The fourth dimension 520 may be greater than the third dimension 518. As such, in some instances, in a direction along the second axis 512, edges or sides of the third section 118 and the fourth section 312 may extend in a direction away from the second axis 512 (e.g., in the Z-direction). Stated alternatively, from the opening 400 to the first side 504, the third section 118 may extend outward, and from the opening 400 to the second side 506, the fourth section 312 may extend outward.

The first section 114, the second section 116, the third section 118, and the fourth section 312 may be defined at least in part by slots 522 formed in, or by, the suspension element 102. For example, a first slot 522(1) may be disposed between the first section 114 and the third section 118, a second slot 522(2) may be disposed between the second section 116 and the third section 118, a third slot 522(3) may be disposed between the second section 116 and the fourth section 312, and a fourth slot 522(4) may be disposed between the first section 114 and the fourth section 312. In some instances, the slots 522 may be disposed at, or adjacent to, the annulus 508. Moreover, at an intersection between the slots 522 and the annulus 508, the suspension element 102 may include a curved profile (e.g., radius) to avoid concreted forces acting on the suspension element 102 and tearing the suspension element 102.

In some instances, the first corrugation(s) 110 may have a sinusoidal path. The first corrugation(s) 110 may include first peaks 524 and first valleys 526, where a first depth 528 of the first corrugation(s) 110 extends in a first direction (e.g., in the Y-direction) between the first peaks 524 and the first valleys 526. Additionally, the first corrugation(s) 110 may have a first width 530 that extends in a second direction between the first peaks 524 or between the first valleys 526 (e.g., in the X-direction). In some instances, the first corrugation(s) 110 may include the same first depth 528 and/or the same first width 530. However, in some instances, the first corrugation(s) 110 may include a different first depth 528 and/or a different first width 530.

The first section 114 may include any number of the first corrugation(s) 110(1) and the second section 116 may include any number of the first corrugation(s) 110(2). For example, the first section 114 may include three of the first corrugation(s) 110(1) and the second section 116 may include three of the first corrugation(s) 110(2). In some instances, the first section 114 and the second section 116 may be identical, and include the same number of first corrugation(s) 110(1) and first corrugation(s) 110(2), respectively. However, in some instances, the first section 114 and the second section 116 may include a different number of first corrugation(s) 110(1) and first corrugation(s) 110(2), respectively. Moreover, in some instances, the first depth 528 of the first corrugation(s) 110(1) and the first corrugation(s) 110(2) may be similar, or different. For example, in some instances, the first peaks 524 and the first valleys 526 may be disposed along similar or different planes. In the former, the first depth 528 may be the same across the first corrugation(s) 110. In the latter, the first depth 528 may be variable across the first corrugation(s) 110. Additionally, or alternatively, in some instances, the first width 530 of the first corrugation(s) 110(1) and the first corrugation(s) 110(2) may be similar, or different.

The second corrugation(s) 112 may have a sinusoidal path. The second corrugation(s) 112 may include second peaks 532 and second valleys 534, where a second depth 536 of the second corrugation(s) 112 extends in a first direction (e.g., in the Y-direction) between the second peaks 532 and the second valleys 534. Additionally, the second corrugation(s) 112 may have a second width 538 that extends in a second direction between the second peaks 532 or the second valleys 534 (e.g., in the Z-direction). In some instances, the second corrugation(s) 112 may include the same second depth 536 and/or the same second depth 536. However, in some instances, the second corrugation(s) 112 may include a different second depth 536 and/or a different second width 538.

The third section 118 may include any number of the second corrugation(s) 112(1) and the fourth section 312 may include any number of the second corrugation(s) 112(2). For example, the third section 118 may include one of the second corrugation(s) 112(1) and the fourth section 312 may include one of the second corrugation(s) 112(2). In some instances, the third section 118 and the fourth section 312 may be identical, and include the same number of first corrugation (s) 112(1) and first corrugation(s) 112(2), respectively. However, in some instances, the first section 114 and the second section 116 may include a different number of first corrugation(s) 112(1) and first corrugation(s) 112(2), respectively. Moreover, in some instances, the second depth 536 of the second corrugation(s) 112(1) and the second corrugation(s) 112(2) may be similar, or different. For example, in some instances, the second peaks 532 and the second valleys 534 may be disposed along similar or different planes. In the former, the second depth 536 may be the same across the second corrugation(s) 112. In the latter, the second depth 536 may be variable across the second corrugation(s) 112. Additionally, or alternatively, in some instances, the second width 538 of the second corrugation(s) 112(1) and the second corrugation(s) 112(2) may be similar, or different.

In some instances, the first corrugation(s) 110 and the second corrugation(s) 112 may be in the same plane or different plane, depending on the stiffness, excursion, and linearity of the audio transducer 100. Additionally, in some instances, the first depth 528 may be different than the second depth 536, and/or the first width 530 and the second width 538 may be different depending upon stiffness and linearity of the audio transducer 100. For example, the first depth 528 may be smaller than the second depth 536. Additionally, or alternatively, the first width 530 may be smaller than the second width 538. In some instances, given the use of the suspension element 102 in high-aspect ratios audio transducers, the audio transducer 100 may have limited space along the second axis 512 to provide suspension. As such, in some instances, the number of first corrugation(s) 110 may be greater than the number of second corrugation(s) 112 disposed along the third section 118 and the fourth section 312.

The suspension element 102 may also include flanges 540 that are used to couple the suspension element 102 to the frame 120. For example, flanges 540 of the suspension element 102 may be disposed on shelves (e.g., lip, flange, etc.) formed by the receptacles 200 of the frame 120. In some instances, the flanges 540 are disposed at least partially along the first section 114, the second section 116, the third section 118, and/or the fourth section 312. For example, the first section 114 may include a first flange 540(1), the second section 116 may include a second flange 540(2), the third section 118 may include a third flange 540(3), and the fourth section 312 may include a fourth flange 540(4). As shown, the flanges 540 may be disposed along a periphery of the suspension element 102, spaced apart from the opening 400.

In some instances, the flanges 540 may be in the same plane or different plane, depending on the stiffness, excursion, and linearity of the audio transducer 100. For example, the first flange 540(1) and the second flange 540(2) may be disposed on a first plane 542, and the third flange 540(3) and the fourth flange 540(4) may be disposed on a second plane 544, spaced apart from the first plane 542 (e.g., in the Y-direction).

FIGS. 6A-6D illustrate the frame 120, according to examples of the present disclosure. The frame 120 may include a cavity 600 in which the suspension element 102 is at least partially disposed. For example, the suspension element 102 may be insertable into the cavity 600. The frame 120 may include shelves 602 (e.g., lips, flanges, etc.) upon which the flanges 540 of the suspension element 102 are disposed. For example, the frame 120 may define a first shelf 602(1), a second shelf 602(2), a third shelf 602(3), and a fourth shelf 602(4). The first flange 540(1) may be disposed on the first shelf 602(1), the second flange 540(2) may be disposed on the second shelf 602(2), the third flange 540(3) may be disposed on the third shelf 602(3), and the fourth flange 540(4) may be disposed on the fourth shelf 602(4). The third shelf 602(3) may be disposed within a first receptacle 200(1) disposed along a first side 604 of the frame 120, and the fourth shelf 602(4) may be disposed within a second receptacle 200(2) disposed along a second side 606 of the frame 120. In some instances, the first receptacle 200(1) may be defined by a first sidewall 608 of the frame 120 and/or the second receptacle 200(2) may be defined by a second sidewall 610 of the frame 120.

In some instances, the shelves 602 may be disposed on different or similar planes (e.g., X-Z) plane. For example, in some instances, the first shelf 602(1) and the second shelf 602(2) may be disposed on a first plane, while the third shelf 602(3) and the fourth shelf 602(4) may be disposed on a second plane. The first plane may be located more proximate to a bottom 612 of the frame 120 as compared to the second plane, which may be located more proximate to a top 614 of the frame 120.

The frame 120 may also define passages 616 for coupling the frame 120 (or more generally, the audio transducer 100) within the device 122. In some instances, the frame 120 defines a groove 618 in which the surround 104 is at least partially disposed. Moreover, an opening 620 may accommodate the yoke 300 of the actuator 108.

FIGS. 7A-7D illustrate a coupling of the suspension element 102 to the frame 120, according to examples of the present disclosure. The suspension element 102 may be at least partially disposed within the cavity 600. For example, the suspension element 102 may be inserted into the cavity 600 from the top 614. Once inserted, the flanges 540 of the suspension element 102 may be disposed on the shelves 602. For example, the first flange 540(1) may be disposed on the first shelf 602(1), the second flange 540(2) may be disposed on the second shelf 602(2), the third flange 540(3) may be disposed on the third shelf 602(3), and the fourth flange 540(4) may be disposed on the fourth shelf 602(4). Additionally, the third flange 540(3) may be at least partially disposed in the first receptacle 200(1) and the fourth flange 540(4) may be at least partially disposed in the second receptacle 200(2).

In some instances, the suspension element 102 may be coupled (e.g., adhered) to the frame 120. Additionally, the opening 400 of the suspension element 102, defined by the annulus 508, may be concentric with the opening 620 in the frame 120. In some instances, the slots 522 in the suspension element 102 permit the suspension element 102 to be inserted into the frame 120 and flex in order to provide suspension to components of the audio transducer 100. For example, the slots 522 may permit the suspension element 102, or the sections, to be bent and inserted into the cavity 600.

Figure 8A:
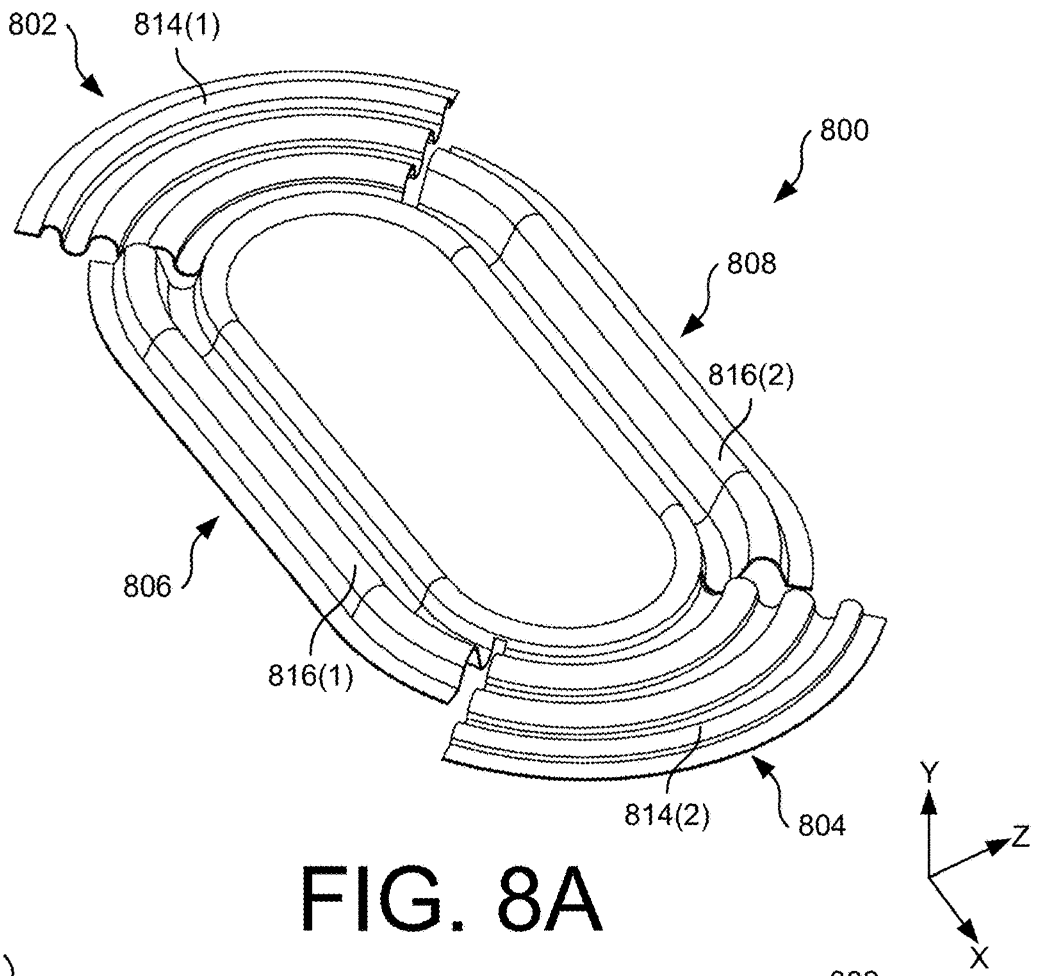
FIGS. 8A-8C illustrate an example suspension element usable with the audio transducer of FIG. 1, according to examples of the present disclosure.
Figure 8B:
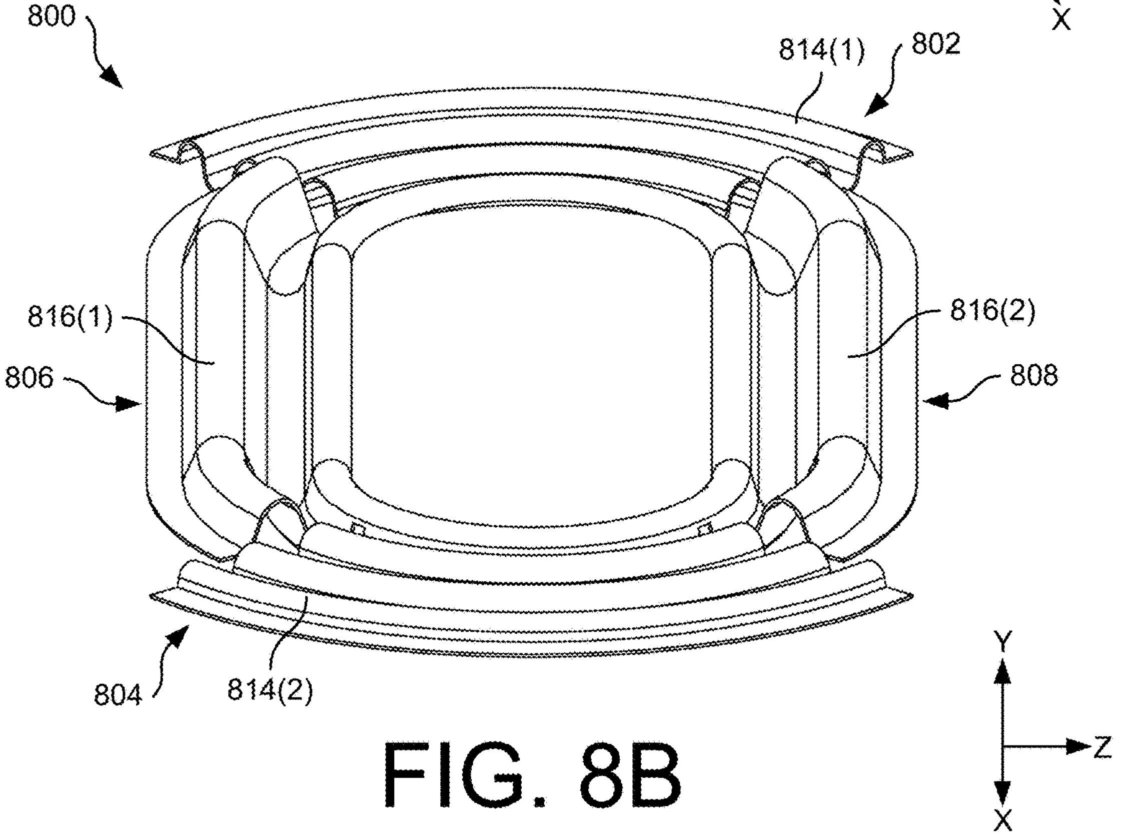
Figure 8C:
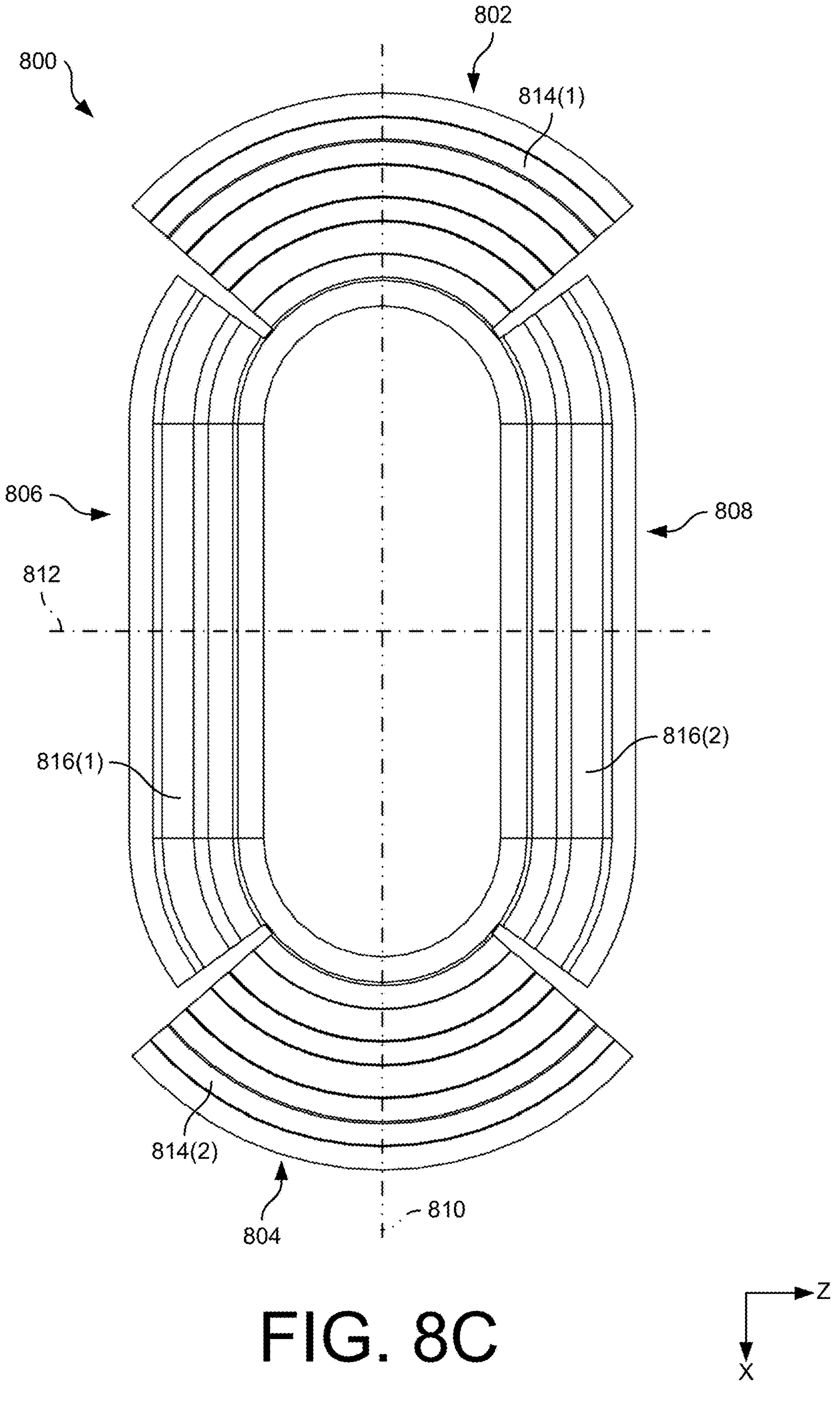

FIGS. 8A-8C illustrate an example suspension element 800, according to examples of the present disclosure. In some instances, the suspension element 800 may be similar to the suspension element 102, as discussed above. For example, the suspension element 800 may include a first section 802, a second section 804, a third section 806, and a fourth section 808. The first section 802 and the second section 804 may be disposed along a first axis 810 of the suspension element 800, and the third section 806 and the fourth section 808 may be disposed along a second axis 812 of the suspension element 800.

The first section 802 may include first corrugation(s) 814(1) and the second section 804 may include first corrugation(s) 814(2). In some instances, the first section 802 may be the same as the second section 804, and the first corrugation(s) 814(1) may be the same as the first corrugation(s) 814(2). Similarly, the third section 806 may include second corrugation(s) 816(1) and the fourth section 808 may include second corrugation(s) 816(2). In some instances, the third section 806 may be the same as the fourth section 808, and the second corrugation(s) 816(1) may be the same as the second corrugation(s) 816(2).

Compared to the third section 118 and the fourth section 312 of the suspension element 102, the third section 806 and the fourth section 808 are shown including a greater length (e.g., in the X-direction, or in a direction along the first axis 810). Additionally, as shown, the third section 806 and the fourth section 808 may include a portion that is oriented parallel to the first axis 810, but may include portions at the end that curve. For example, portions of the third section 806 and the fourth section 808 may curve around sides of the suspension element 800 so as to be at least partially disposed on ends of the suspension element 800. Similar to the suspension element 102, the first section 802, the second section 804, the third section 806, and the fourth section 808 may taper outwards in a direction along the first axis 810 and the second axis 812, respectively.

In some instances, the first corrugation(s) 814 may be similar or different than the second corrugation(s) 816. For example, the suspension element 800 may include three and a half of the first corrugation(s) 814 on the first section 802 and the second section 804. The three and a half of the first corrugation(s) 814 may be in a direction along the first axis 810. The suspension element 800 may include one and a half of the second corrugation(s) 816 on the third section 806 and the fourth section 808. The one and a half of the second corrugation(s) 816 may be in a direction along the second axis 812.

The first corrugation(s) 814 and the second corrugation(s) 816 may have a different depth (e.g., in the Y-direction) and/or width (e.g., in the X-direction and/or Z-direction) as compared to one another. Additionally, the first corrugation(s) 814 may have a similar depth and/or width, and/or the second corrugation(s) 816 may have a similar depth and/or width. The depths and widths of the first corrugation(s) 814 and the second corrugation(s) 816 may be based on stiffness and excursion requirements of a audio transducer employing the suspension element 800.

The suspension element 800 further includes slots disposed between the first section 802, the second section 804, the third section 806, and the fourth section 808, respectively. Additionally, the suspension element 800 includes flanges disposed along first section 802, the second section 804, the third section 806, and the fourth section 808, which rest on shelves of a frame. In some instances, the suspension element 800 may be used with the frame 120, or the location, position, orientation, etc. of the shelves 602 may be adjusted to accommodate the suspension element 800. The suspension element 800 also includes an annulus with an opening for accommodating the former 308.

Figure 9A:
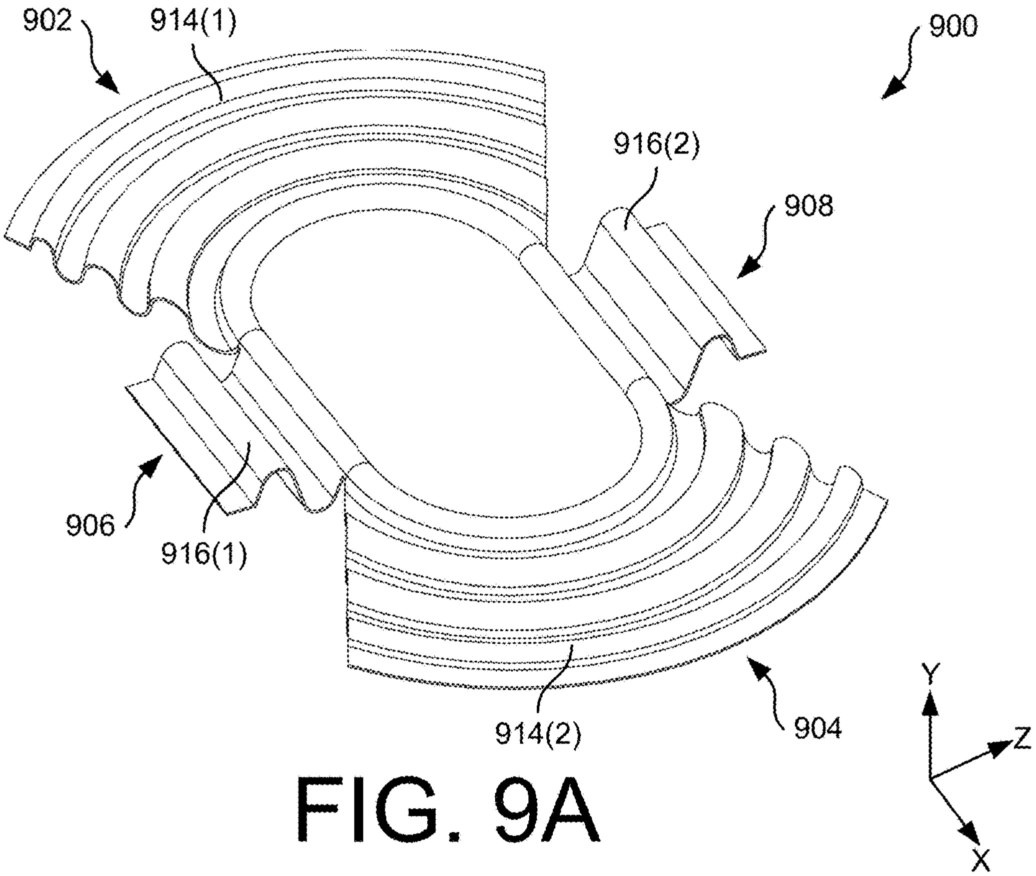
FIGS. 9A-9C illustrate an example suspension element usable with the audio transducer of FIG. 1, according to examples of the present disclosure.
Figure 9B:
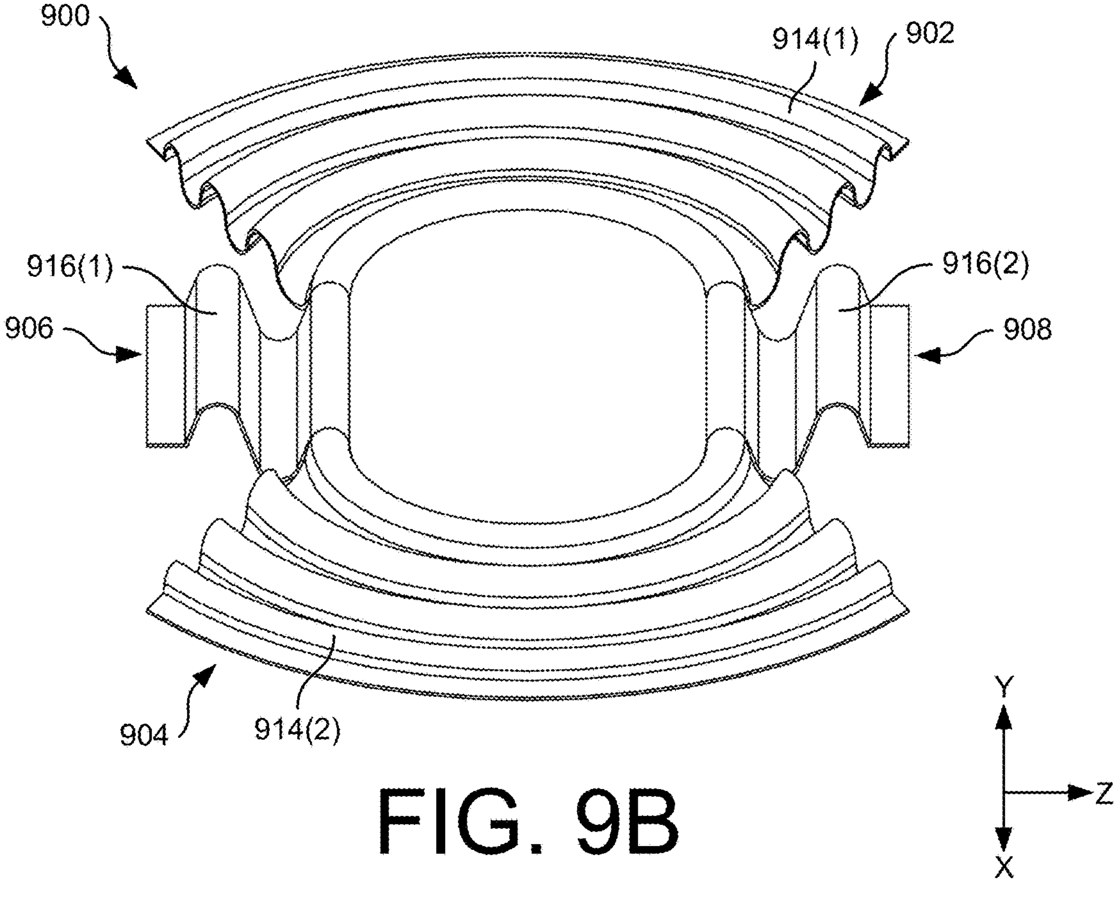
Figure 9C:
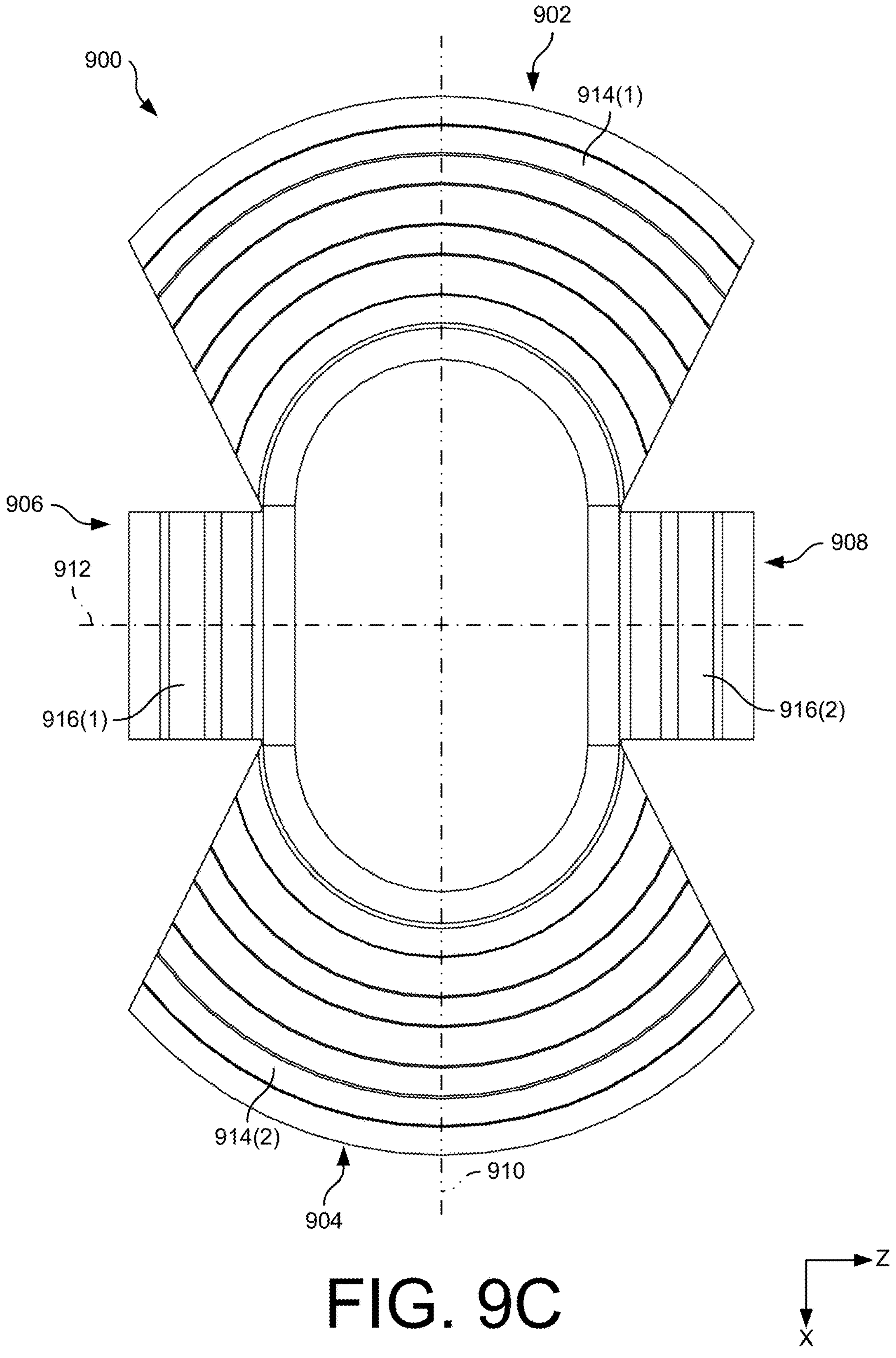

FIGS. 9A-9C illustrate an example suspension element 900, according to examples of the present disclosure. In some instances, the suspension element 900 may be similar to the suspension element 102 and/or the suspension element 800 as discussed above. For example, the suspension element 900 may include a first section 902, a second section 904, a third section 906, and a fourth section 908. The first section 902 and the second section 904 may be disposed along a first axis 910 of the suspension element 900, and the third section 906 and the fourth section 908 may be disposed along a second axis 912 of the suspension element 900.

The first section 902 may include first corrugation(s) 914(1) and the second section 904 may include first corrugation(s) 914(2). In some instances, the first section 902 may be the same as the second section 904, and the first corrugation(s) 914(1) may be the same as the first corrugation(s) 914(2). Similarly, the third section 906 may include second corrugation(s) 916(1) and the fourth section 908 may include second corrugation(s) 916(2). In some instances, the third section 906 may be the same as the fourth section 908, and the second corrugation(s) 916(1) may be the same as the second corrugation(s) 916(2).

Compared to the third section 118 and the fourth section 312 of the suspension element 102, or the third section 806 and the fourth section 808 of the suspension element 800, the third section 906 and the fourth section 908 are shown including a shorter length (e.g., in the X-direction, or in a direction along the first axis 910). Additionally, as shown, the third section 906 and the fourth section 908 may include a constant length (e.g., along the first axis 910). In other words, the third section 906 and the fourth section 908 may not taper outwards along the second axis 912. Similar to the suspension element 102 and/or the suspension element 800, the first section 902 and the second section 904, may taper outwards in a direction along the first axis 910, respectively.

In some instances, the first corrugation(s) 914 may be similar or different than the second corrugation(s) 916. For example, the suspension element 900 may include three and a half of the first corrugation(s) 914 on the first section 902 and the second section 904. The three and a half of the first corrugation(s) 914 may in a direction along the first axis 910. The suspension element 900 may include one and a half of the second corrugation(s) 916 on the third section 906 and the fourth section 908. The one and a half of the second corrugation(s) 916 may in a direction along the second axis 912.

The first corrugation(s) 914 and the second corrugation(s) 916 may have a different depth (e.g., in the Y-direction) and/or width (e.g., in the X-direction and/or Z-direction) as compared to one another. Additionally, the first corrugation(s) 914 may have a similar depth and/or width, and/or the second corrugation(s) 916 may have a similar depth and/or width. The depths and widths of the first corrugation(s) 914 and the second corrugation(s) 916 may be based on stiffness and excursion requirements of a audio transducer employing the suspension element 900.

The suspension element 900 further includes slots disposed between the first section 902, the second section 904, the third section 906, and the fourth section 908, respectively. Additionally, the suspension element 900 includes flanges disposed along first section 902, the second section 904, the third section 906, and the fourth section 908, which rest on shelves of a frame. In some instances, the suspension element 900 may be used with the frame 120, or the location, position, orientation, etc. of the shelves 602 may be adjusted to accommodate the suspension element 900. The suspension element 900 also includes an annulus with an opening for accommodating the former 308.

Figure 10:
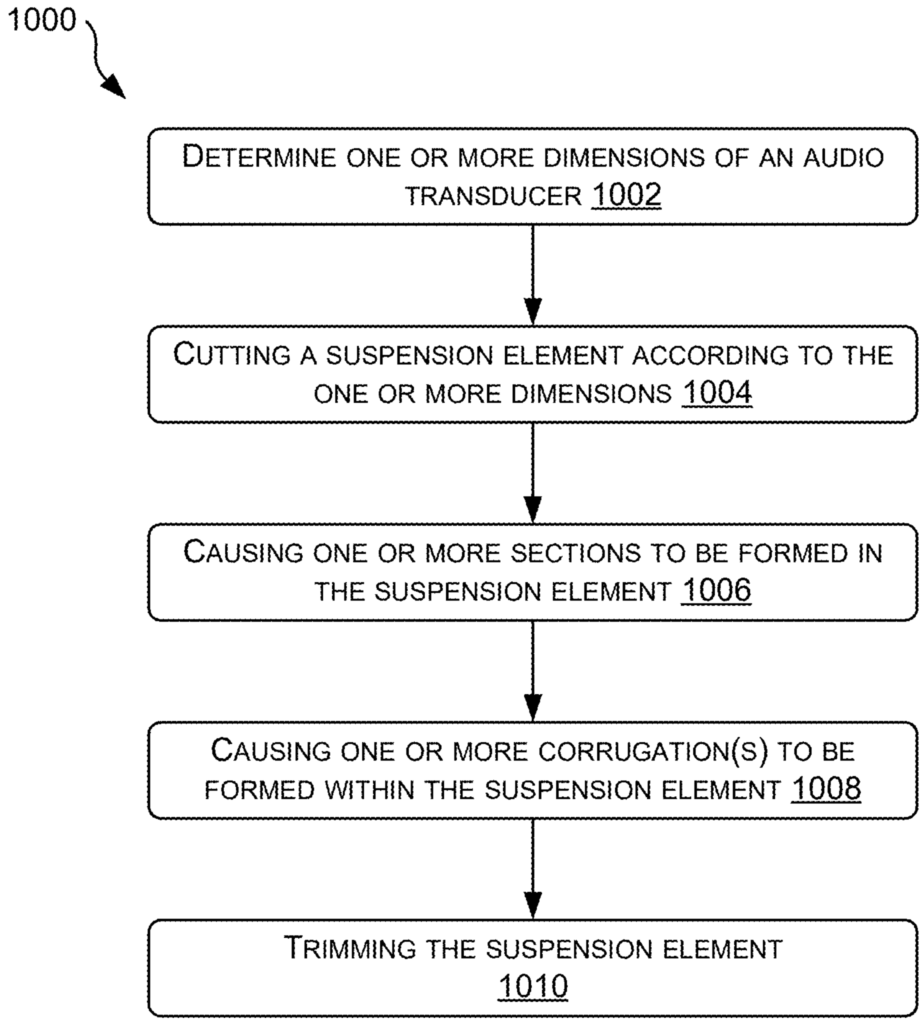
FIG. 10 illustrates an example process for forming a suspension element of the audio transducer of FIG. 1, according to examples of the present disclosure.

FIG. 10 illustrates a process 1000 (e.g., method) related to forming a suspension element for an audio transducer, according to examples of the present disclosure. The process 1000 described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process 1000, or alternative processes, and not all of the blocks need be executed. For discussion purposes, the process 1000 are described with reference to the environments, devices, architectures, diagrams, and systems described in the examples herein, such as, for example those described with respect to FIGS. 1-9C, although the process 1000 may be implemented in a wide variety of other environments, architectures, and systems.

At 1002, the process 1000 may include determining one or more dimensions of an audio transducer. For example, dimension(s) of an audio transducer may be determined for generating a suspension element for the audio transducer.

At 1004, the process 1000 may include cutting a suspension element according to the one or more dimensions. For example, a piece of material (e.g., raw material, cloth roll, etc.) from which the suspension element is formed may be cut to length, width, etc. In some instances, the one or more dimensions to which the suspension element is cut may be sized larger than the suspension element, but may be trimmed later to predetermined specifications. In some instances, the suspension element may be formed from a single layer of material, or multiple layers of material.

At 1006, the process 1000 may include causing one or more sections to be formed in the suspension element. For example, different sections of the suspension element may be formed, where slots may be disposed between adjacent sections. In some instances, the process 1000 may perform 1004 and 1006 at the same time, or at different times. In some instances, a stress-release glue may be applied to an end of the slots to absorb energy and prevent the suspension element from tearing.

At 1008, the process 1000 may include causing one or more corrugations to be formed within the suspension element. For example, using thermal forming, press-hardening, stamping, etc. the corrugations may be formed. In some instances, forming the corrugation(s) may include forming first corrugation(s) along one or more sections of the suspension element, and forming second corrugation(s) along one or more different sections of the suspension element. Compared to one another, the first corrugation(s) and the second corrugation(s) may have a different depth (e.g., amplitude), width (e.g., wavelength), shape, number, etc. In some instances, the first corrugation(s) and the second corrugation(s) may be formed at the same time, via a single press, or at different times, via different presses.

At 1010, the process 1000 may include trimming the suspension element. For example, after forming the corrugation(s), the suspension element may be trimmed. In some instances, trimming the suspension element may involve forming a shape of the sections, forming an opening of the suspension element for accommodating the actuator of the audio transducer, and so forth.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A device comprising:

an audio transducer including:
- a cone,
- a surround disposed around the cone,
- a dustcap,
- a former having a voice coil, and
- a suspension element including:
  - a first section having first corrugations,
  - a second section opposite the first section, the second section having second corrugations that are a same as the first corrugations,
  - a third section having third corrugations that are different than the first corrugations,
  - a fourth section opposite the third section, the fourth section having fourth corrugations that are a same as the third corrugations, and
  - an opening in which the former is at least partially disposed; and a frame in which the audio transducer is at least partially disposed.

2. The device of claim 1, wherein:

the frame includes a first shelf, a second shelf, a third shelf, and a fourth shelf;

the first section includes a first flange disposed on the first shelf;

the second section includes a second flange disposed on the second shelf;

the third section includes a third flange disposed on the third shelf; and the fourth section includes a fourth flange disposed on the fourth shelf.

3. The device of claim 1, wherein:

the first corrugations and the second corrugations include a first depth and a first width;

the third corrugations and the fourth corrugations includes a second depth and a second width;

the second depth is different than the first depth; and the second width is different than the second depth.

4. The device of claim 1, wherein the suspension element includes:

a first slot disposed between the first section and the third section;

a second slot disposed between the second section and the third section;

a third slot disposed between the second section and the fourth section; and a fourth slot disposed between the first section and the fourth section.

5. The device of claim 1, wherein:

the first corrugations and the second corrugations includes a first number of corrugations; and the third corrugations and the fourth corrugations includes a second number of corrugations, the second number of corrugations being less than the first number of corrugations.

6. An audio transducer comprising:

a frame; and a suspension element at least partially disposed in the frame, the suspension element including:

a first axis, a second axis, a first section disposed along the first axis, the first section having one or more first corrugations, a second section disposed along the first axis, the second section having one or more second corrugations, a third section disposed along the second axis, the third section having one or more third corrugations different than the one or more first corrugations, and a fourth section disposed along the second axis, the fourth section having one or more fourth corrugations.

7. The audio transducer of claim 6, wherein:

the first section is a same as the second section; and the third section is a same as the fourth section.

8. The audio transducer of claim 6, wherein:

the one or more first corrugations and the one or more second corrugations are a same; and the one or more third corrugations and the one or more fourth corrugations are a same.

9. The audio transducer of claim 6, wherein:

the one or more first corrugations include a first depth and a first width;

the one or more second corrugations include a second depth and a second width;

the one or more third corrugations include a third depth and a third width; and the one or more fourth corrugations include a fourth depth and a fourth width.

10. The audio transducer of claim 9, wherein:

the first depth is a same as the second depth;

the first width is a same as the second width;

the third depth is a same as the fourth depth;

the third width is a same as the fourth width;

the first depth is different than the third depth; and the first width is different than the third width.

11. The audio transducer of claim 6, wherein:

a first number of the one or more first corrugations and a second number of the one or more second corrugations are a same;

a third number of the one or more third corrugations and a fourth number of the one or more fourth corrugations are a same; and the first number and the third number are different.

12. The audio transducer of claim 11, wherein the first number is greater than the third number.

13. The audio transducer of claim 6, wherein the suspension element includes:

a first slot disposed between the first section and the third section;

a second slot disposed between the second section and the third section;

a third slot disposed between the second section and the fourth section; and a fourth slot disposed between the first section and the fourth section.

14. The audio transducer of claim 6, wherein:

the suspension element includes an opening; and the audio transducer includes a former is at least partially disposed through the opening.

15. The audio transducer of claim 6, wherein:

the frame includes a first shelf, a second shelf, a third shelf, and a fourth shelf;

the first section includes a first flange disposed on the first shelf;

the second section includes a second flange disposed on the second shelf;

the third section includes a third flange disposed on the third shelf; and the fourth section includes a fourth flange disposed on the fourth shelf.

16. The audio transducer of claim 15, wherein:

the first flange and the second flange are disposed on a first plane; and the third flange and the fourth flange are disposed on a second plane different than the first plane.

17. A suspension element for an audio transducer, comprising:

a first section including one or more first corrugations having a first depth and a first width;

a second section including one or more second corrugations having the first depth and the first width;

a third section including one or more third corrugations having a second depth different than the first depth, and a second width different than the first width; and a fourth section including one or more fourth corrugations having the second depth and the second width.

18. The suspension element of claim 17, wherein:

first number of the one or more first corrugations and a second number of the one or more second corrugations are a same;

a third number of the one or more third corrugations and a fourth number of the one or more fourth corrugations are a same; and the first number and the third number are different.

19. The suspension element of claim 17, wherein:

a first slot disposed between the first section and the third section;

a second slot disposed between the second section and the third section;

a third slot disposed between the second section and the fourth section; and a fourth slot disposed between the first section and the fourth section.

20. The suspension element of claim 17, wherein:

the first section and the second section include a first shape; and the third section and the fourth section include a second shape different than the first shape.

* * * * *